US008986104B2

(12) United States Patent
Nicely

(10) Patent No.: US 8,986,104 B2
(45) **Date of Patent: *Mar. 24, 2015**

(54) GAMING SYSTEM, DEVICE, AND METHOD PROVIDING A MULTIPLE STREAK GAME

(71) Applicant: IGT, Las Vegas, NV (US)

(72) Inventor: Mark C. Nicely, Daly City, CA (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/043,292

(22) Filed: Oct. 1, 2013

(65) Prior Publication Data

US 2014/0038687 A1 Feb. 6, 2014

Related U.S. Application Data

(63) Continuation of application No. 13/173,546, filed on Jun. 30, 2011, now Pat. No. 8,562,419.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ............ *G07F 17/3286* (2013.01); *G07F 17/32* (2013.01); *G07F 17/3213* (2013.01); *G07F 17/322* (2013.01); *G07F 17/3258* (2013.01); *G07F 17/3267* (2013.01)

USPC .................. 463/20; 463/16; 463/17; 463/18; 463/19

(58) Field of Classification Search

None

See application file for complete search history.

(56) References Cited

U.S. PATENT DOCUMENTS

| | | | |
|---|---|---|---|
| 1,578,412 | A | 3/1926 | Ewig |
| 3,628,259 | A | 12/1971 | Kahn |
| 3,819,186 | A | 6/1974 | Hinterstocker |

(Continued)

FOREIGN PATENT DOCUMENTS

| | | | |
|---|---|---|---|
| AU | 199717601 | B2 | 9/1997 |
| AU | 199917318 | A1 | 9/1999 |

(Continued)

OTHER PUBLICATIONS

European Search Report for corresponding EP Application No. 12173780.3, dated Oct. 5, 2012 (7 pages).

*Primary Examiner* — Kevin Y Kim

(74) *Attorney, Agent, or Firm* — Neal, Gerber & Eisenberg LLP

(57) ABSTRACT

One embodiment provides a gaming system providing a multiple streak game associated with a base or primary wagering game. The multiple streak game includes a multiple streak having a multiple streak continuation condition and a single streak having a single streak continuation condition. The multiple streak is initially the active streak. If an outcome a play of the base or primary wagering game satisfies the multiple streak continuation condition, the multiple streak remains the active streak and the player may win an award. If the outcome does not satisfy the multiple streak continuation condition but satisfies the single streak continuation condition, the multiple streak ends, the at least one single streak is set as the active streak, and the player may win an award. If the outcome does not satisfy either the multiple streak continuation condition or the at least one single streak continuation condition, the multiple streak game ends.

20 Claims, 21 Drawing Sheets

(56) References Cited

U.S. PATENT DOCUMENTS 4,077,631 A 3/1978 Tela, Sr.
4,156,976 A 6/1979 Mikun
4,198,052 A 4/1980 Gauselmann
4,222,561 A 9/1980 Whitten
4,260,159 A 4/1981 Hoffman
4,337,945 A 7/1982 Levy
4,448,419 A 5/1984 Telnaes
4,621,814 A 11/1986 Stepan et al.
4,624,459 A 11/1986 Kaufman
4,669,731 A 6/1987 Clarke
4,679,143 A 7/1987 Hagiwara
4,695,053 A 9/1987 Vazquez, Jr. et al.
4,732,386 A 3/1988 Rayfiel
4,743,022 A 5/1988 Wood
4,805,907 A 2/1989 Hagiwara
4,836,546 A 6/1989 DiRe et al.
4,837,728 A 6/1989 Barrie et al.
4,838,552 A 6/1989 Hagiwara
4,840,375 A 6/1989 Lawlor et al.
4,880,237 A 11/1989 Kishishita
4,906,005 A 3/1990 Manabe
4,941,665 A 7/1990 Klamer
4,989,878 A 2/1991 Davies
4,991,848 A 2/1991 Greenwood et al.
5,011,159 A 4/1991 Fortunato et al.
5,019,973 A 5/1991 Wilcox et al.
5,046,735 A 9/1991 Hamano et al.
5,083,785 A 1/1992 Okada
5,085,436 A 2/1992 Bennett
5,088,737 A 2/1992 Frank et al.
5,100,137 A 3/1992 Fulton
5,102,134 A 4/1992 Smyth
5,102,135 A 4/1992 Addiechi
5,116,055 A 5/1992 Tracy
5,123,649 A 6/1992 Tiberio
5,131,655 A 7/1992 Ugala
5,152,529 A 10/1992 Okada
5,167,413 A 12/1992 Fulton
5,184,821 A 2/1993 Korenek
5,197,736 A 3/1993 Backus et al.
5,224,706 A 7/1993 Bridgeman et al.
5,251,897 A 10/1993 Fulton
5,259,616 A 11/1993 Bergmann
5,294,120 A 3/1994 Schultz
5,294,128 A 3/1994 Marquez
5,308,065 A 5/1994 Bridgeman et al.
5,332,228 A 7/1994 Schultz
5,342,047 A 8/1994 Heidel et al.
5,344,144 A 9/1994 Canon
5,356,140 A 10/1994 Dabrowski et al.
5,375,830 A 12/1994 Takemoto et al.
5,377,973 A 1/1995 Jones et al.
5,380,008 A 1/1995 Mathis et al.
5,393,057 A 2/1995 Marnell, II
5,393,061 A 2/1995 Manship et al.
5,395,111 A 3/1995 Inoue
5,397,125 A 3/1995 Adams
5,401,023 A 3/1995 Wood
5,405,143 A 4/1995 Takemoto et al.
5,407,200 A 4/1995 Zalabak
5,415,404 A 5/1995 Joshi et al.
5,423,539 A 6/1995 Nagao
5,431,408 A 7/1995 Adams
5,437,452 A 8/1995 Graf et al.
5,449,173 A 9/1995 Thomas et al.
5,456,465 A 10/1995 Durham
5,489,101 A 2/1996 Moody
5,509,655 A 4/1996 Ugawa
5,511,781 A 4/1996 Wood et al.
5,531,448 A 7/1996 Moody
5,540,442 A 7/1996 Orselli et al.
5,542,669 A 8/1996 Charron et al.
5,553,851 A 9/1996 Malavazos et al.
5,560,603 A 10/1996 Seelig et al.
5,564,700 A 10/1996 Celona
5,569,084 A 10/1996 Nicastro et al.
5,570,885 A 11/1996 Ornstein
5,580,055 A 12/1996 Hagiwara
5,584,486 A 12/1996 Franklin
5,584,763 A 12/1996 Kelly et al.
5,584,764 A 12/1996 Inoue
5,588,650 A 12/1996 Eman et al.
5,593,161 A 1/1997 Boylan et al.
5,611,535 A 3/1997 Tiberio
5,630,585 A 5/1997 Takemoto et al.
5,636,837 A 6/1997 Takemoto et al.
5,636,838 A 6/1997 Caro
5,639,089 A 6/1997 Matsumoto et al.
5,645,485 A 7/1997 Clapper, Jr.
5,645,486 A 7/1997 Nagao et al.
5,647,798 A 7/1997 Falciglia
5,655,961 A 8/1997 Acres et al.
5,657,993 A 8/1997 Merlino et al.
5,678,001 A 10/1997 Nagel et al.
5,695,402 A 12/1997 Stupah
5,702,304 A 12/1997 Acres et al.
5,707,285 A 1/1998 Place et al.
5,711,715 A 1/1998 Ringo et al.
5,718,431 A 2/1998 Ornstein
5,720,662 A 2/1998 Holmes, Jr. et al.
D392,340 S 3/1998 DeSimone
5,722,891 A 3/1998 Inoue
5,725,428 A 3/1998 Achmuller
5,732,950 A 3/1998 Moody
5,743,798 A 4/1998 Adams et al.
5,755,440 A 5/1998 Sher
5,766,074 A 6/1998 Cannon et al.
5,769,716 A 6/1998 Saffari et al.
5,770,533 A 6/1998 Franchi
5,772,506 A 6/1998 Marks et al.
5,772,509 A 6/1998 Weiss
5,775,692 A 7/1998 Watts et al.
5,788,573 A 8/1998 Baerlocher et al.
5,791,987 A 8/1998 Chen et al.
5,807,172 A 9/1998 Piechowiak
5,810,361 A 9/1998 Kadlic
5,816,916 A 10/1998 Moody
5,816,918 A 10/1998 Kelly et al.
5,820,460 A 10/1998 Fulton
5,823,873 A 10/1998 Moody
5,823,874 A 10/1998 Adams
5,833,537 A 11/1998 Barrie
5,833,538 A 11/1998 Weiss
5,836,583 A 11/1998 Towers
5,848,932 A 12/1998 Adams
5,855,514 A 1/1999 Kamille
5,857,909 A 1/1999 Rubin
5,868,619 A 2/1999 Wood et al.
5,876,284 A 3/1999 Acres et al.
5,882,105 A 3/1999 Barlow
5,882,258 A 3/1999 Kelly et al.
5,882,261 A 3/1999 Adams
5,890,962 A 4/1999 Takemoto
5,902,184 A 5/1999 Bennett
5,910,048 A 6/1999 Feinberg
5,911,418 A 6/1999 Adams
5,918,880 A 7/1999 Voigt, IV et al.
5,934,672 A 8/1999 Sines et al.
5,934,999 A 8/1999 Valdez
5,935,002 A 8/1999 Falciglia
5,947,820 A 9/1999 Morro et al.
5,951,397 A 9/1999 Dickinson
5,954,335 A 9/1999 Moody
5,964,463 A 10/1999 Moore, Jr.
5,967,893 A 10/1999 Lawrence et al.
5,971,849 A 10/1999 Falciglia
D416,054 S 11/1999 McGahn et al.
5,976,016 A 11/1999 Moody et al.
5,980,384 A 11/1999 Barrie
5,984,310 A 11/1999 English
5,984,781 A 11/1999 Sunaga
5,984,782 A 11/1999 Inoue
5,988,638 A 11/1999 Rodesch et al.
5,993,316 A 11/1999 Coyle et al.

(56) References Cited

U.S. PATENT DOCUMENTS

| | | | |
|---|---|---|---|
| 5,997,401 | A | 12/1999 | Crawford |
| 6,003,867 | A | 12/1999 | Rodesch et al. |
| 6,004,207 | A | 12/1999 | Wilson, Jr. et al. |
| 6,007,066 | A | 12/1999 | Moody |
| 6,007,424 | A | 12/1999 | Evers et al. |
| 6,012,720 | A | 1/2000 | Webb |
| 6,012,981 | A | 1/2000 | Fujioka et al. |
| 6,012,982 | A | 1/2000 | Piechowiak et al. |
| 6,012,983 | A | 1/2000 | Walker et al. |
| 6,032,955 | A | 3/2000 | Luciano et al. |
| 6,033,307 | A | 3/2000 | Vancura |
| 6,039,649 | A | 3/2000 | Schulze |
| 6,047,963 | A | 4/2000 | Pierce et al. |
| 6,053,813 | A | 4/2000 | Mathis |
| 6,053,823 | A | 4/2000 | Mathews |
| 6,056,642 | A | 5/2000 | Bennett |
| 6,059,289 | A | 5/2000 | Vancura |
| 6,059,658 | A | 5/2000 | Mangano et al. |
| 6,059,659 | A | 5/2000 | Busch et al. |
| 6,062,980 | A | 5/2000 | Luciano |
| 6,062,981 | A | 5/2000 | Luciano, Jr. |
| 6,071,192 | A | 6/2000 | Weiss |
| 6,083,105 | A | 7/2000 | Ronin et al. |
| 6,089,977 | A | 7/2000 | Bennett |
| 6,089,978 | A | 7/2000 | Adams |
| 6,089,980 | A | 7/2000 | Gauselmann |
| 6,093,101 | A | 7/2000 | Mourad |
| 6,093,102 | A | 7/2000 | Bennett |
| 6,098,985 | A | 8/2000 | Moody |
| 6,102,400 | A | 8/2000 | Scott et al. |
| 6,102,402 | A | 8/2000 | Scott et al. |
| 6,102,798 | A | 8/2000 | Bennett |
| 6,105,962 | A | 8/2000 | Malavazos et al. |
| 6,110,041 | A | 8/2000 | Walker et al. |
| 6,113,098 | A | 9/2000 | Adams |
| 6,120,031 | A | 9/2000 | Adams |
| 6,120,378 | A | 9/2000 | Moody et al. |
| 6,126,165 | A | 10/2000 | Sakamoto |
| 6,126,541 | A | 10/2000 | Fuchs |
| 6,126,542 | A | 10/2000 | Fier |
| 6,129,632 | A | 10/2000 | Luciano |
| 6,132,311 | A | 10/2000 | Williams |
| 6,135,884 | A | 10/2000 | Hedrick et al. |
| 6,142,872 | A | 11/2000 | Walker et al. |
| 6,142,873 | A | 11/2000 | Weiss et al. |
| 6,142,874 | A | 11/2000 | Kodachi et al. |
| 6,142,875 | A | 11/2000 | Kodachi et al. |
| 6,149,521 | A | 11/2000 | Sanduski |
| 6,155,925 | A | 12/2000 | Giobbi et al. |
| 6,158,741 | A | 12/2000 | Koelling |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,162,121 | A | 12/2000 | Morro et al. |
| 6,168,520 | B1 | 1/2001 | Baerlocher et al. |
| 6,168,522 | B1 | 1/2001 | Walker et al. |
| 6,168,523 | B1 | 1/2001 | Piechowiak et al. |
| 6,173,955 | B1 | 1/2001 | Perrie et al. |
| 6,174,233 | B1 | 1/2001 | Sunaga et al. |
| 6,174,235 | B1 | 1/2001 | Walker et al. |
| 6,179,711 | B1 | 1/2001 | Yoseloff |
| 6,186,894 | B1 | 2/2001 | Mayeroff |
| 6,190,254 | B1 | 2/2001 | Bennett |
| 6,190,255 | B1 | 2/2001 | Thomas et al. |
| 6,193,606 | B1 | 2/2001 | Walker et al. |
| 6,196,547 | B1 | 3/2001 | Pascal et al. |
| 6,203,009 | B1 | 3/2001 | Sines et al. |
| 6,203,010 | B1 | 3/2001 | Jorasch et al. |
| 6,203,429 | B1 | 3/2001 | Demar et al. |
| 6,203,430 | B1 | 3/2001 | Walker et al. |
| 6,209,869 | B1 | 4/2001 | Mathews |
| 6,210,277 | B1 | 4/2001 | Stefan |
| 6,217,022 | B1 | 4/2001 | Astaneha |
| 6,217,448 | B1 | 4/2001 | Olsen |
| 6,220,959 | B1 | 4/2001 | Holmes, Jr. et al. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,542 | B1 | 5/2001 | Cosmi |
| 6,227,969 | B1 | 5/2001 | Yoseloff |
| 6,227,971 | B1 | 5/2001 | Weiss |
| 6,231,442 | B1 | 5/2001 | Mayeroff |
| 6,231,445 | B1 | 5/2001 | Acres |
| 6,234,897 | B1 | 5/2001 | Frohm et al. |
| 6,238,287 | B1 | 5/2001 | Komori et al. |
| 6,238,288 | B1 | 5/2001 | Walker et al. |
| 6,244,957 | B1 | 6/2001 | Walker et al. |
| 6,251,013 | B1 | 6/2001 | Bennett |
| 6,254,482 | B1 | 7/2001 | Walker et al. |
| 6,254,483 | B1 | 7/2001 | Acres |
| 6,257,981 | B1 | 7/2001 | Acres et al. |
| 6,261,178 | B1 | 7/2001 | Bennett |
| 6,264,200 | B1 | 7/2001 | Smith |
| 6,270,409 | B1 | 8/2001 | Shuster |
| 6,270,411 | B1 | 8/2001 | Gura et al. |
| 6,270,412 | B1 | 8/2001 | Crawford et al. |
| 6,290,600 | B1 | 9/2001 | Glasson |
| 6,290,603 | B1 | 9/2001 | Luciano, Jr. |
| 6,299,165 | B1 | 10/2001 | Nagano |
| 6,299,170 | B1 | 10/2001 | Yoseloff |
| 6,302,398 | B1 | 10/2001 | Vecchio |
| 6,302,790 | B1 | 10/2001 | Brossard |
| 6,302,791 | B1 | 10/2001 | Frohm et al. |
| 6,305,686 | B1 | 10/2001 | Perrie et al. |
| 6,309,299 | B1 | 10/2001 | Weiss |
| 6,311,976 | B1 | 11/2001 | Yoseloff et al. |
| 6,312,331 | B1 | 11/2001 | Tamaki |
| 6,312,334 | B1 | 11/2001 | Yoseloff |
| 6,315,660 | B1 | 11/2001 | DeMar et al. |
| 6,315,662 | B1 | 11/2001 | Jorasch et al. |
| 6,315,663 | B1 | 11/2001 | Sakamoto |
| 6,319,122 | B1 | 11/2001 | Packes, Jr. et al. |
| 6,319,124 | B1 | 11/2001 | Baerlocher et al. |
| 6,322,078 | B1 | 11/2001 | Adams |
| 6,336,860 | B1 | 1/2002 | Webb |
| 6,336,862 | B1 | 1/2002 | Byrne |
| 6,336,863 | B1 | 1/2002 | Baerlocher et al. |
| 6,340,158 | B2 | 1/2002 | Pierce et al. |
| 6,352,260 | B1 | 3/2002 | Santiago |
| 6,358,144 | B1 | 3/2002 | Kaddlic et al. |
| 6,358,147 | B1 | 3/2002 | Jaffe et al. |
| 6,364,314 | B1 | 4/2002 | Canterbury |
| 6,364,766 | B1 | 4/2002 | Anderson et al. |
| 6,364,768 | B1 | 4/2002 | Acres et al. |
| 6,368,214 | B1 | 4/2002 | Luciano |
| 6,371,853 | B1 | 4/2002 | Borta |
| 6,375,569 | B1 | 4/2002 | Acres |
| 6,375,570 | B1 | 4/2002 | Poole |
| 6,390,470 | B1 | 5/2002 | Huang |
| 6,394,902 | B1 | 5/2002 | Glavich et al. |
| 6,398,218 | B1 | 6/2002 | Vancura |
| 6,398,220 | B1 | 6/2002 | Inoue |
| 6,398,644 | B1 | 6/2002 | Perrie et al. |
| 6,413,162 | B1 | 7/2002 | Baerlocher et al. |
| 6,413,163 | B1 | 7/2002 | Yamauchi et al. |
| 6,419,579 | B1 | 7/2002 | Bennett |
| 6,428,412 | B1 | 8/2002 | Anderson et al. |
| 6,435,511 | B1 | 8/2002 | Vancura et al. |
| 6,435,968 | B1 | 8/2002 | Torango |
| 6,439,943 | B1 | 8/2002 | Aoki et al. |
| 6,439,993 | B1 | 8/2002 | O'Halloran |
| 6,439,995 | B1 | 8/2002 | Hughs-Baird et al. |
| 6,443,452 | B1 | 9/2002 | Brune |
| 6,443,456 | B1 | 9/2002 | Gajor |
| 6,446,965 | B1 | 9/2002 | Boulton |
| 6,450,884 | B1 | 9/2002 | Seelig et al. |
| 6,454,266 | B1 | 9/2002 | Breeding et al. |
| 6,461,241 | B1 | 10/2002 | Webb et al. |
| 6,467,770 | B1 | 10/2002 | Matosevic |
| 6,468,156 | B1 | 10/2002 | Hughs-Baird et al. |
| 6,471,208 | B2 | 10/2002 | Yoseloff et al. |
| 6,481,713 | B2 | 11/2002 | Perrie et al. |
| 6,491,584 | B2 | 12/2002 | Graham et al. |

(56) References Cited

U.S. PATENT DOCUMENTS 6,494,454 B2 12/2002 Adams
6,497,409 B2 12/2002 Mathews
6,517,432 B1 2/2003 Jaffe
6,520,503 B1 2/2003 Porto
6,520,854 B1 2/2003 McNally
6,537,150 B1 3/2003 Luciano et al.
6,537,152 B2 3/2003 Seelig et al.
6,547,663 B1 4/2003 Delott et al.
6,551,187 B1 4/2003 Jaffe
6,554,283 B2 4/2003 Vancura et al.
6,561,512 B2 5/2003 Luciano et al.
6,561,904 B2 5/2003 Locke et al.
6,565,436 B1 5/2003 Baerlocher
6,569,013 B1 5/2003 Taylor
6,575,834 B1 6/2003 Lindo
6,599,185 B1 7/2003 Kaminkow et al.
6,599,193 B2 7/2003 Baerlocher et al.
6,602,136 B1 8/2003 Baerlocher et al.
6,602,137 B2 8/2003 Kaminkow et al.
6,604,740 B1 8/2003 Singer et al.
6,609,969 B1 8/2003 Luciano et al.
6,609,970 B1 8/2003 Juciano, Jr.
6,612,927 B1 9/2003 Slomiany et al.
6,616,142 B2 9/2003 Adams
6,632,139 B1 10/2003 Baerlocher
6,632,140 B2 10/2003 Berman et al.
6,634,942 B2 10/2003 Walker et al.
6,634,945 B2 10/2003 Glavich et al.
6,652,378 B2 11/2003 Cannon et al.
6,656,043 B2 12/2003 Seelig et al.
6,659,461 B2 12/2003 Yoseloff et al.
6,659,462 B1 12/2003 Scott
6,663,106 B1 12/2003 Cosmi
6,666,766 B2 12/2003 Baerlocher et al.
6,682,073 B2 1/2004 Bryant et al.
6,695,696 B1 2/2004 Kaminkow
6,712,693 B1 3/2004 Hettinger
6,712,694 B1 3/2004 Nordman
6,712,695 B2 3/2004 Mothwurf et al.
6,726,563 B1 4/2004 Baerlocher et al.
6,733,389 B2 5/2004 Webb et al.
6,739,970 B2 5/2004 Luciano
6,743,102 B1 6/2004 Fiechter et al.
6,758,167 B1 7/2004 Edelinski
6,758,749 B2 7/2004 Krintzman
6,764,396 B2 7/2004 Seelig et al.
6,776,711 B1 8/2004 Baerlocher
6,780,105 B1 8/2004 Kaminkow
6,786,824 B2 9/2004 Cannon
6,802,778 B1 10/2004 Lemay et al.
6,805,349 B2 10/2004 Baerlocher et al.
6,811,483 B1 11/2004 Webb et al.
6,857,957 B2 2/2005 Marks et al.
6,869,359 B1 3/2005 Mathews
6,869,360 B2 3/2005 Marks et al.
6,878,061 B2 4/2005 Baerlocher et al.
6,884,167 B2 4/2005 Walker et al.
6,890,255 B2 5/2005 Jarvis et al.
6,890,257 B2 5/2005 Baerlocher
6,899,620 B2 5/2005 Kaminkow et al.
6,905,406 B2 6/2005 Kaminkow et al.
6,908,383 B2 6/2005 Baerlocher et al.
6,913,532 B2 7/2005 Baerlocher et al.
6,921,072 B2 7/2005 Hughes-Watts
6,921,335 B2 7/2005 Rodgers et al.
6,923,720 B2 8/2005 Loose
6,926,607 B2 8/2005 Slomiany et al.
6,929,952 B2 8/2005 Baerlocher
6,955,600 B2 10/2005 Glavich et al.
6,960,133 B1 11/2005 Marks et al.
6,960,136 B2 11/2005 Joshi et al.
6,988,731 B2 1/2006 Inoue
6,991,544 B2 1/2006 Soltys et al.
7,001,274 B2 2/2006 Baerlocher et al.
7,008,324 B1 3/2006 Johnson et al.
7,014,560 B2 3/2006 Glavich et al.
7,029,395 B1 4/2006 Baerlocher
7,066,814 B2 6/2006 Glavich et al.
7,094,150 B2 8/2006 Ungaro et al.
7,121,943 B2 10/2006 Webb et al.
7,169,044 B2 1/2007 Baerlocher
7,204,488 B2 4/2007 Ilievski
RE39,659 E 5/2007 Luciano et al.
7,216,867 B1 5/2007 Luciano et al.
7,258,609 B2 8/2007 Nordman et al.
2001/0003709 A1 6/2001 Adams
2001/0005690 A1 6/2001 Boulton
2001/0009865 A1 7/2001 Demar et al.
2001/0015525 A1 8/2001 Mathews
2001/0018361 A1 8/2001 Acres
2001/0022429 A1 9/2001 Luciano et al.
2001/0023199 A1 9/2001 Walker et al.
2001/0038178 A1 11/2001 Vancura
2002/0010014 A1 1/2002 Parra et al.
2002/0010017 A1 1/2002 Bennett
2002/0052233 A1 5/2002 Gauselmann
2002/0086725 A1 7/2002 Fasbender et al.
2002/0137559 A1 9/2002 Baerlocher
2002/0165023 A1 11/2002 Brosnan et al.
2002/0167126 A1 11/2002 Herman de Raedt
2002/0169017 A1 11/2002 Visoenik
2002/0187827 A1 12/2002 Blankstein
2002/0193160 A1 12/2002 Tarantino
2003/0025211 A1 2/2003 Bruce et al.
2003/0027623 A1 2/2003 Rose
2003/0027626 A1 2/2003 Marks et al.
2003/0045344 A1 3/2003 Webb et al.
2003/0050110 A1 3/2003 Wichinsky
2003/0054873 A1 3/2003 Peterson
2003/0060266 A1 3/2003 Baerlocher
2003/0060269 A1 3/2003 Paulsen et al.
2003/0060272 A1 3/2003 Glavich et al.
2003/0060281 A1 3/2003 Vancura
2003/0069062 A1 4/2003 Shimizu
2003/0069063 A1 4/2003 Bilyeu et al.
2003/0073480 A1 4/2003 Thomas et al.
2003/0073483 A1 4/2003 Glavich et al.
2003/0092480 A1 5/2003 White et al.
2003/0092490 A1 5/2003 Gauselmann
2003/0094752 A1 5/2003 Mathews et al.
2003/0098543 A1 5/2003 Porto
2003/0153383 A1 8/2003 Baerlocher et al.
2003/0155708 A1 8/2003 Perrie et al.
2003/0162585 A1 8/2003 Bigelow et al.
2003/0195031 A1 10/2003 O'Donovan et al.
2003/0203753 A1 10/2003 Muir et al.
2003/0207713 A1 11/2003 Taylor
2003/0216165 A1 11/2003 Singer et al.
2003/0232651 A1 12/2003 Huard et al.
2004/0002372 A1 1/2004 Rodgers et al.
2004/0017043 A1 1/2004 Moody
2004/0038731 A1 2/2004 Englman
2004/0048650 A1 3/2004 Mierau et al.
2004/0048652 A1 3/2004 Ching et al.
2004/0053666 A1 3/2004 Vancura
2004/0053672 A1 3/2004 Baerlocher
2004/0061285 A1 4/2004 Hughes-Watts
2004/0063493 A1 4/2004 Baerlocher
2004/0067790 A1 4/2004 Peterson et al.
2004/0072609 A1 4/2004 Ungaro et al.
2004/0072612 A1 4/2004 Rodgers et al.
2004/0077398 A1 4/2004 Jarvis et al.
2004/0102244 A1 5/2004 Kryuchkov et al.
2004/0116177 A1 6/2004 Frost et al.
2004/0116179 A1 6/2004 Nicely et al.
2004/0137982 A1 7/2004 Cuddy et al.
2004/0147306 A1 7/2004 Randall et al.
2004/0147311 A1 7/2004 Fujimoto
2004/0152500 A1 8/2004 Baerlocher
2004/0159590 A1 8/2004 Mothwurf
2004/0162129 A1 8/2004 Nelson
2004/0162130 A1 8/2004 Walker et al.
2004/0171415 A1 9/2004 Webb et al.
2004/0176156 A1 9/2004 Walker et al.

(56) References Cited

U.S. PATENT DOCUMENTS

| | | | |
|---|---|---|---|
| 2004/0212150 | A1 | 10/2004 | Huard et al. |
| 2004/0219969 | A1 | 11/2004 | Casey et al. |
| 2004/0242302 | A1 | 12/2004 | Baerlocher |
| 2004/0242315 | A1 | 12/2004 | Paulsen et al. |
| 2004/0251624 | A1 | 12/2004 | Hodapp et al. |
| 2004/0254011 | A1 | 12/2004 | Muskin |
| 2004/0256804 | A1 | 12/2004 | Huard et al. |
| 2004/0266510 | A1 | 12/2004 | Kojima |
| 2004/0266512 | A1 | 12/2004 | Kaminkow |
| 2004/0266516 | A1 | 12/2004 | Thomas |
| 2004/0266517 | A1 | 12/2004 | Bleich et al. |
| 2005/0014550 | A1 | 1/2005 | Rhoten |
| 2005/0020346 | A1 | 1/2005 | Baerlocher |
| 2005/0029745 | A1 | 2/2005 | Walker et al. |
| 2005/0037838 | A1 | 2/2005 | Dunaevsky et al. |
| 2005/0049035 | A1 | 3/2005 | Baerlocher et al. |
| 2005/0054429 | A1 | 3/2005 | Baerlocher et al. |
| 2005/0059481 | A1 | 3/2005 | Joshi et al. |
| 2005/0060050 | A1 | 3/2005 | Baerlocher |
| 2005/0070354 | A1 | 3/2005 | Baerlocher et al. |
| 2005/0075163 | A1 | 4/2005 | Cuddy et al. |
| 2005/0079911 | A1 | 4/2005 | Nakatsu |
| 2005/0090306 | A1 | 4/2005 | Seelig et al. |
| 2005/0130737 | A1 | 6/2005 | Englman et al. |
| 2005/0176494 | A1 | 8/2005 | Thomas |
| 2005/0192076 | A1 | 9/2005 | Lowery |
| 2005/0192079 | A1 | 9/2005 | Lowery |
| 2005/0215307 | A1 | 9/2005 | Jarvis et al. |
| 2005/0215311 | A1 | 9/2005 | Hornik et al. |
| 2005/0218590 | A1 | 10/2005 | O'Halloran et al. |
| 2005/0233796 | A1 | 10/2005 | Baerlocher et al. |
| 2005/0233801 | A1 | 10/2005 | Baerlocher et al. |
| 2005/0233803 | A1 | 10/2005 | Yang |
| 2005/0255904 | A1 | 11/2005 | Duhamel |
| 2005/0282615 | A1 | 12/2005 | Englman et al. |
| 2005/0282629 | A1 | 12/2005 | Gagner |
| 2005/0285336 | A1 | 12/2005 | Ilievski |
| 2005/0285337 | A1 | 12/2005 | Durham et al. |
| 2006/0003834 | A1 | 1/2006 | Okada |
| 2006/0009283 | A1 | 1/2006 | Englman et al. |
| 2006/0009286 | A1 | 1/2006 | Durham et al. |
| 2006/0014580 | A1 | 1/2006 | Hawthorn |
| 2006/0019744 | A1 | 1/2006 | Roemer |
| 2006/0025193 | A1 | 2/2006 | Gail et al. |
| 2006/0025211 | A1 | 2/2006 | Wilday et al. |
| 2006/0046833 | A1 | 3/2006 | Hatakeyama et al. |
| 2006/0066044 | A1 | 3/2006 | Dabosh |
| 2006/0069619 | A1 | 3/2006 | Walker et al. |
| 2006/0073873 | A1 | 4/2006 | Rodgers et al. |
| 2006/0073897 | A1 | 4/2006 | Englman et al. |
| 2006/0094495 | A1 | 5/2006 | Gelber et al. |
| 2006/0157927 | A1 | 7/2006 | O'Halloran et al. |
| 2006/0157928 | A1 | 7/2006 | O'Halloran |
| 2006/0170154 | A1 | 8/2006 | Matsuno et al. |
| 2006/0170155 | A1 | 8/2006 | Silverman |
| 2006/0178191 | A1 | 8/2006 | Ellis |
| 2006/0205480 | A1 | 9/2006 | Glavich et al. |
| 2006/0217174 | A1 | 9/2006 | Walker et al. |
| 2006/0237905 | A1 | 10/2006 | Nicely et al. |
| 2006/0246989 | A1 | 11/2006 | Glavich et al. |
| 2006/0287034 | A1 | 12/2006 | Englman et al. |
| 2006/0287053 | A1 | 12/2006 | Yokota |
| 2007/0021182 | A1 | 1/2007 | Gauselmann |
| 2007/0057452 | A1 | 3/2007 | Dargue |
| 2007/0060292 | A1 | 3/2007 | Peterson |
| 2007/0069459 | A1 | 3/2007 | Guindulain Vidondo |
| 2007/0075488 | A1 | 4/2007 | Pececnik |
| 2007/0135203 | A1 | 6/2007 | Nicely |
| 2007/0135204 | A1 | 6/2007 | Nicely |
| 2008/0113730 | A1 | 5/2008 | Okada |
| 2009/0298578 | A1 | 12/2009 | Yoshizawa |

FOREIGN PATENT DOCUMENTS

| | | | |
|---|---|---|---|
| AU | 200245837 | | 12/2002 |
| EP | 0 060 019 | A1 | 9/1982 |
| EP | 0 558 307 | A2 | 2/1993 |
| EP | 0 753 331 | A2 | 1/1997 |
| EP | 0 874 337 | A1 | 10/1998 |
| EP | 0 926 645 | A2 | 6/1999 |
| EP | 0 945 837 | A2 | 9/1999 |
| EP | 0 981 119 | A2 | 2/2000 |
| EP | 0 984 407 | A2 | 3/2000 |
| EP | 0 984 408 | A2 | 3/2000 |
| EP | 0 989 531 | A2 | 3/2000 |
| EP | 1 076 321 | A1 | 2/2001 |
| EP | 1 195 730 | A2 | 4/2002 |
| EP | 1 226 851 | | 7/2002 |
| EP | 1 513 116 | A2 | 9/2004 |
| EP | 1 536 388 | A1 | 1/2005 |
| EP | 1 513 114 | A2 | 3/2005 |
| EP | 1 513 117 | A2 | 3/2005 |
| EP | 1 580 701 | A2 | 3/2005 |
| EP | 1 589 501 | A1 | 10/2005 |
| EP | 1 671 684 | | 6/2006 |
| EP | 1 710 000 | | 10/2006 |
| EP | 1 721 642 | | 11/2006 |
| EP | 1 736 215 | | 12/2006 |
| EP | 1 769 828 | | 4/2007 |
| GB | 0 970 806 | | 9/1964 |
| GB | 2 101 380 | A | 1/1983 |
| GB | 2 137 392 | A | 10/1984 |
| GB | 2 292 245 | A | 2/1996 |
| GB | 2 322 217 | | 8/1998 |
| GB | 2 354 179 | | 3/2001 |
| GB | 2 358 591 | | 8/2001 |
| GB | 2 371 494 | | 7/2002 |
| GB | 2 382 911 | A | 6/2003 |
| GB | 2 387 950 | A | 10/2003 |
| GB | 2 395 139 | | 5/2004 |
| GB | 2 431 362 | | 4/2007 |
| WO | WO 85/00910 | | 2/1985 |
| WO | WO 97/32285 | | 9/1997 |
| WO | WO 9738766 | | 10/1997 |
| WO | WO 98/00207 | | 1/1998 |
| WO | WO 99/03078 | | 1/1999 |
| WO | WO 00/32286 | | 6/2000 |
| WO | WO 00/33269 | | 6/2000 |
| WO | WO 00/66235 | | 11/2000 |
| WO | WO 01/26019 | A1 | 4/2001 |
| WO | WO 02/056984 | | 7/2002 |
| WO | WO 02/078804 | A1 | 10/2002 |
| WO | WO 03/026757 | A1 | 4/2003 |
| WO | WO 2004/023400 | | 3/2004 |
| WO | WO 2004/025584 | A2 | 3/2004 |
| WO | WO 2005/077480 | A1 | 8/2005 |
| WO | WO 2005/083599 | A1 | 9/2005 |
| WO | WO 2006/014833 | A2 | 2/2006 |
| WO | WO 2006/015442 | A1 | 2/2006 |
| WO | WO 2006/017431 | A2 | 2/2006 |
| WO | WO 2006/061616 | | 6/2006 |
| WO | WO 2006/078219 | | 7/2006 |
| WO | WO 2006/094398 | | 9/2006 |
| WO | WO 2006/097007 | | 9/2006 |
| WO | WO 2007/024202 | | 3/2007 |
| WO | WO 2007/033430 | | 3/2007 |
| WO | WO 2007/077449 | | 7/2007 |
| WO | WO 2007/080421 | | 7/2007 |

GAMING SYSTEM, DEVICE, AND METHOD PROVIDING A MULTIPLE STREAK GAME

PRIORITY CLAIM

This application is a continuation of, and claims priority to and the benefit of, U.S. patent application Ser. No. 13/173,546, filed on Jun. 30, 2011, the entire contents of which are incorporated herein by reference.

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

There are a variety of wagering games to play in casinos and other gaming environments such as online gaming environments. Roulette is one such known wagering game that involves a moving wheel and a ball that travels along the moving wheel. Depending upon where the ball stops, a player may win or lose a wager. Craps and Sic Bo are other such known wagering games, both of which utilize six-sided dice. There is a need to increase the level of interest, excitement, and volatility associated with playing wagering games such as Roulette, Craps, and Sic Bo. There is also a need to enhance the operational functionality of, or otherwise provide improvements to and interesting variations of, wagering games such as Roulette, Craps, and Sic Bo.

There are also a variety of wagering games to play in casinos and other gaming environments that enable a player to place a side or streak wager in association with a plurality of consecutive plays of a base or primary wagering game. In these known streak games, if the outcome of each of the consecutive plays of the underlying base or primary wagering game satisfies a same single condition, the player may win an award based on the side or streak wager. In one of these known streak games, a player may place a side or streak wager on the occurrence of a designated number of consecutive winning outcomes of plays of the base or primary wagering game. In this streak game, the single condition is a winning outcome of a play of the base or primary wagering game and, therefore, the single condition is satisfied when a play of the base or primary wagering game results in a winning outcome. Thus, the player wins an award based on the side or streak wager if the designated number of consecutive plays of the base or primary wagering game each result in a winning outcome (i.e., if the outcome of each of the designated number of consecutive plays of the base or primary wagering game satisfies the condition). In another known streak game, a player may place a side or streak wager on the occurrence of a designated number of consecutive losing outcomes of plays of the underlying base or primary wagering game. In this streak game, the single condition is a losing outcome of a play of the base or primary wagering game and, therefore, the single condition is satisfied when a play of the base or primary wagering game results in a losing outcome. Thus, the player wins an award based on the side or streak wager if the designated number of consecutive plays of the base or primary wagering game each result in a losing outcome (i.e., if the outcome of each of the designated number of consecutive plays of the base or primary wagering game satisfies the condition).

In one known type of streak game that is associated with a base or primary game, a player may win a single award associated with a streak wager. In this type of streak game, the player wins and is provided with that single award after a designated number of consecutive plays of the base or primary wagering game have each satisfied a same single condition. In another known type of streak game that is associated with a base or primary game, a player may win multiple awards associated with a streak wager. In this type of streak game, the player wins one of the awards after each of play of the base or primary wagering game satisfies a same single condition. These awards accumulate, and are provided to the player upon completion of the streak game. In another known type of streak game, a player may win multiple awards associated with a streak wager. In this type of streak game, the player wins and is provided with one of the awards after each play of the base or primary wagering game satisfies a same single condition. There is a need to increase the level of interest, excitement, and volatility associated with playing base or primary wagering games having side or streak games.

SUMMARY

Various embodiments of the present disclosure provide a gaming system, gaming device, and method providing a multiple streak game. In one embodiment, the multiple streak game is associated with a number of consecutive plays of a base or primary wagering game having a plurality of different outcomes. The gaming system and method enable a player to place a streak wager to participate in the multiple streak game. In one embodiment, the multiple streak game includes a multiple streak having a multiple streak continuation condition and at least one additional streak having an additional streak continuation condition. The multiple streak continuation condition is satisfied when each of a first quantity of conditions is satisfied, the first quantity of conditions being at least two. The additional streak continuation condition is satisfied when each of a second quantity of conditions is satisfied, the second quantity of conditions being at least one. Each of the conditions comprising the multiple streak continuation condition (i.e., each of the first quantity of conditions) and the additional streak continuation condition (i.e., each of the second quantity of conditions) may be satisfied by certain of the different outcomes of the base wagering game.

Initially, the multiple streak is the active streak in this embodiment. After a play of the base or primary wagering game results in one of the different outcomes, if that outcome satisfies the multiple streak continuation condition (i.e., satisfies each of the conditions of the first quantity of conditions), the multiple streak remains the active streak and the player may win an award associated with the streak wager and the multiple streak. If the outcome of the play of the base or primary wagering game does not satisfy the multiple streak continuation condition but satisfies the additional streak continuation condition (i.e., does not satisfy each of the conditions of the first quantity of conditions but satisfies each of the conditions of the second quantity of conditions), the multiple streak ends, the at least one additional streak is set as the active streak, and the player may win an award associated with the streak wager and the at least one additional streak. If the outcome of the play of base or primary wagering game does not satisfy either the multiple streak continuation condition or the at least one additional streak continuation condition, the multiple streak game ends.

Additional features and advantages are described herein, and will be apparent from, the following Detailed Description and the Figures.

BRIEF DESCRIPTION OF THE FIGURES

FIGS. 14A, 148, 14C, and 14D are front elevational views of the multiple streak game area of an embodiment of the multiple streak game of the present disclosure that causes the player to forfeit a portion of the streak wager when the active streak changes from the multiple streak to the first or second streak.

DETAILED DESCRIPTION

Gaming Device and Electronics

The present disclosure may be implemented in various configurations for gaming machines, gaming devices, or gaming systems, including but not limited to: (1) a dedicated gaming machine, gaming device, or gaming system wherein the computerized instructions for controlling any games (that are provided by the gaming machine or gaming device) are provided with the gaming machine or gaming device prior to delivery to a gaming establishment; and (2) a changeable gaming machine, gaming device, or gaming system wherein the computerized instructions for controlling any games (that are provided by the gaming machine or gaming device) are downloadable to the gaming machine or gaming device through a data network (such as the Internet) after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any base or primary wagering games are communicated from the central server to the gaming device in a thick client configuration and computerized instructions for controlling any bonus games or functions are executed by a central server in a thin client configuration.

Figure 1A:
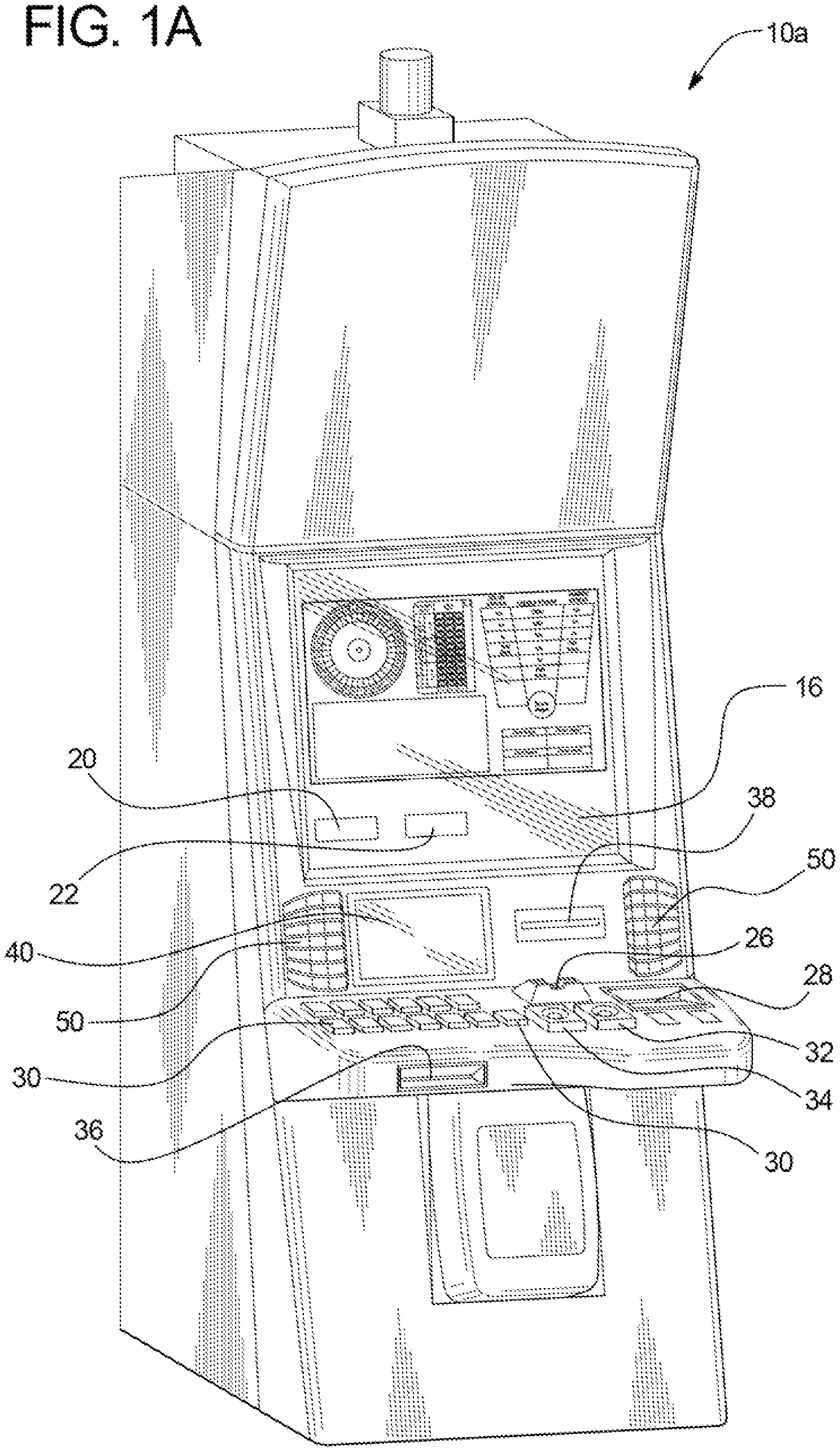
FIGS. 1A and 1B are front perspective views of alternative embodiments of gaming devices disclosed herein.
Figure 1B:
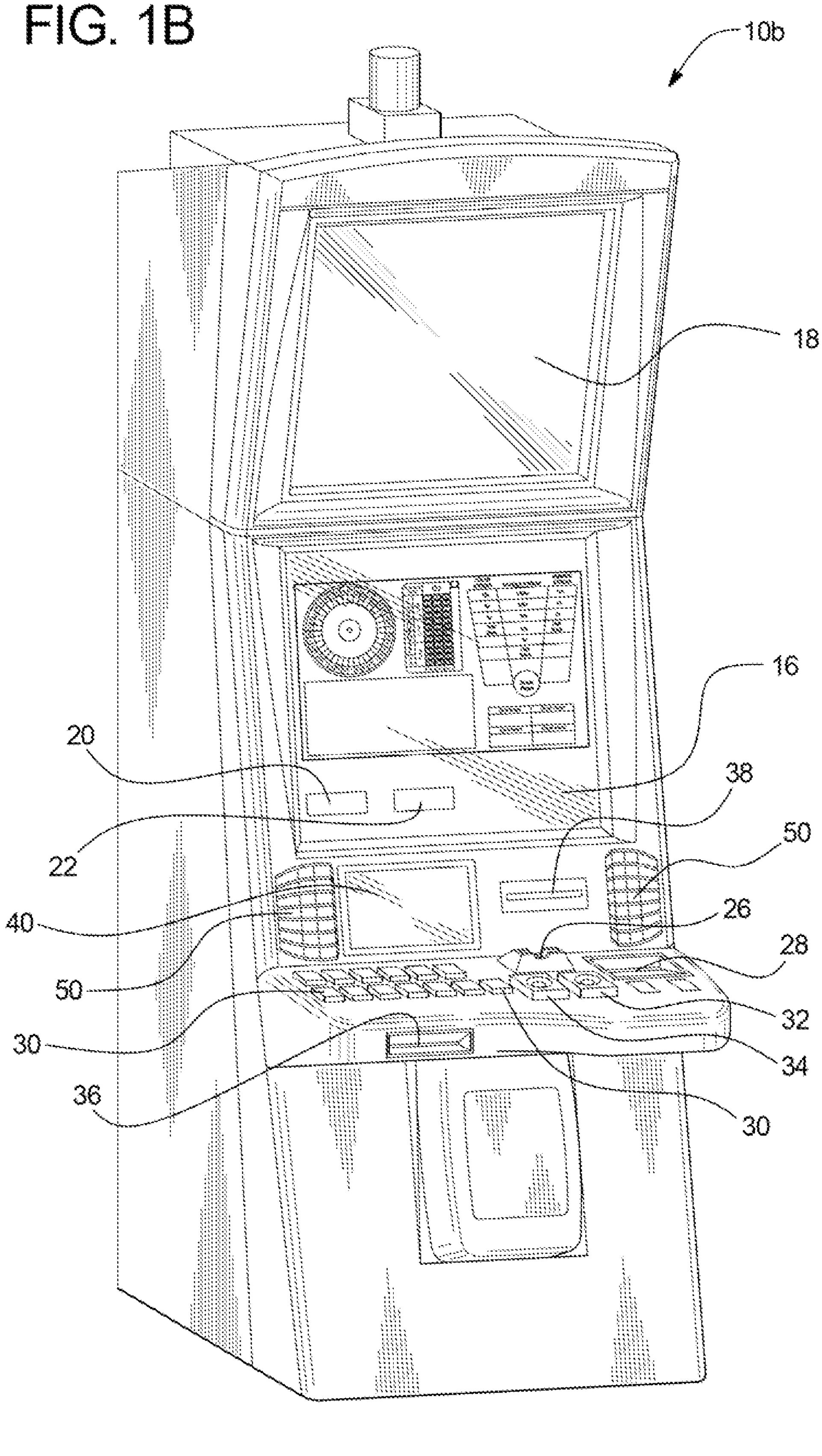

Referring now to the drawings, two example alternative embodiments of a gaming device that implements the base or primary wagering game and the multiple streak game disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet that provides support for a plurality of displays, inputs, controls, and other features of a conventional gaming machine. It is configured so that a player may operate it while standing or sitting. The gaming device may be positioned on a base or stand or may be configured as a pub-style table-top game (not shown) that a player may operate preferably while sitting. As illustrated by the different configurations shown in FIGS. 1A and 1B, the gaming device may have varying cabinet and display configurations.

Figure 2A:
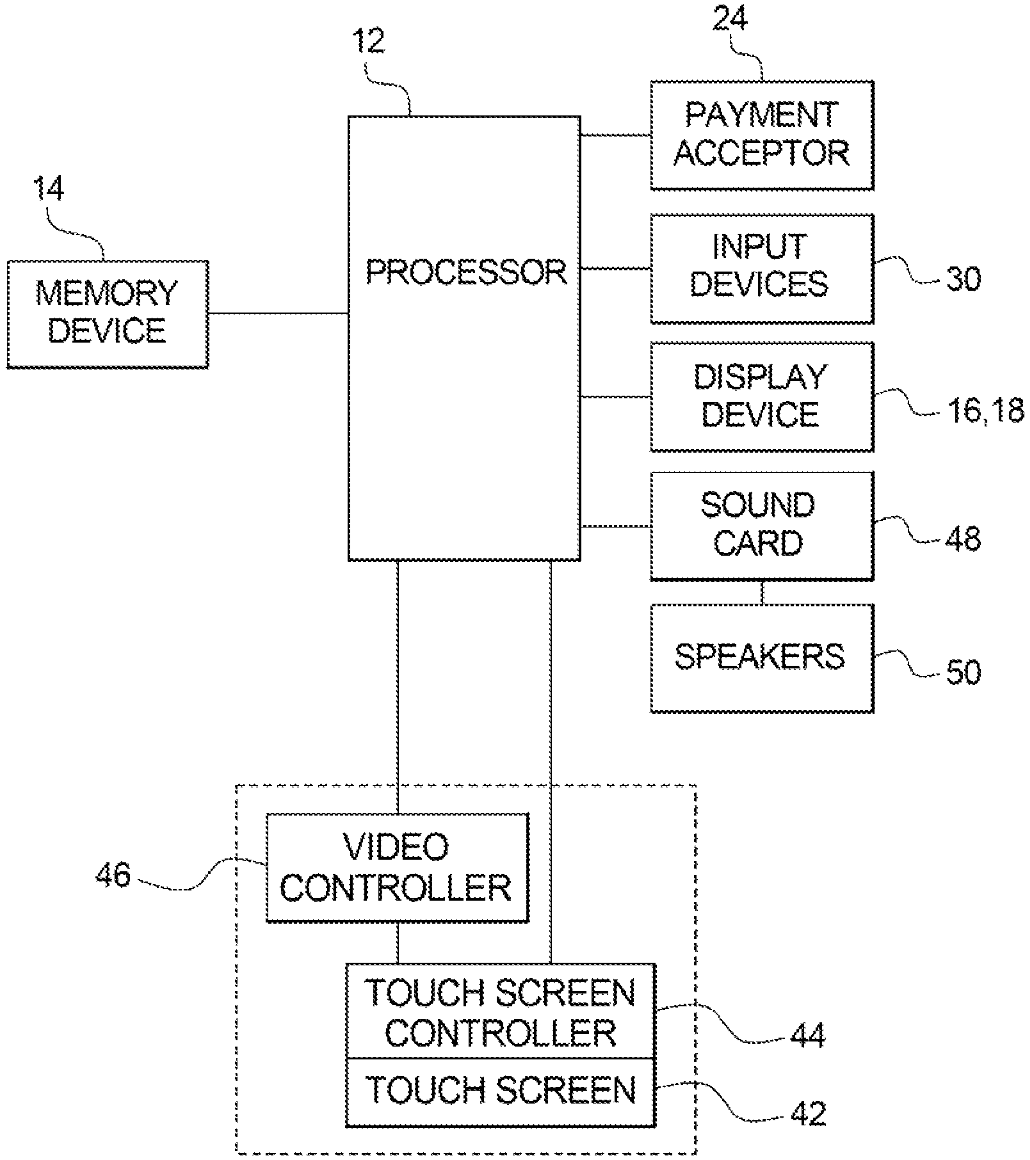
FIG. 2A is a schematic block diagram of the electronic configuration of one embodiment of a gaming device disclosed herein.

In one embodiment, as illustrated in FIG. 2A, the gaming device preferably includes at least one processor 12, such as a microprocessor, a microcontroller-based platform, a suitable integrated circuit, or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which may include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above may be stored in a detachable or removable memory device, such as, but not limited to, a suitable cartridge, disk, CD ROM, DVD, or USB memory device. In other embodiments, part or all of the program code and/or operating data described above may be downloaded to the memory device through a suitable network.

In one embodiment, an operator or a player may use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, such as part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 that displays a base or primary wagering game. This display device also displays the multiple streak game of the present disclosure, which is associated with the base or primary wagering game, as well as information relating to the base or primary wagering game or the multiple streak game. The alternative embodiment shown in FIG. 1B includes a central display device 16 and an upper display device 18. The upper display device may display the base or primary wagering game, the multiple streak game associated with the base or primary wagering game, and/or information relating to the base or primary wagering game or the multiple streak game. These display devices may also serve as digital glass operable to advertise games or other aspects of the gaming establishment. As shown in FIGS. 1A and 1B, in one embodiment, the gaming device includes a credit display 20 that displays a player's current number of credits, cash, account balance, or the equivalent. In one embodiment, the gaming device includes a bet display 22 that displays a player's amount wagered. In one embodiment, as discussed in more detail below, the gaming device includes a player tracking display 40 that displays information regarding a player's play tracking status.

In another embodiment, at least one display device may be a mobile display device, such as a PDA or tablet PC, that enables play of at least a portion of the base or primary wagering game or the bonus game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as discussed in more detail below, the display device includes a touch-screen with an associated touch-screen controller. The display devices may be of any suitable size and configuration, such as a square, a rectangle, or an elongated rectangle.

The display devices of the gaming device are configured to display at least one and preferably a plurality of game or other suitable images, symbols, and indicia such as any visual representation or exhibition of the movement of objects such as mechanical, virtual, or video reels and wheels; dynamic lighting; video images; images of people, characters, places, things, or faces of cards; and the like.

In one alternative embodiment, the symbols, images, and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As shown in FIGS. 1A and 1B, a payment device such as a payment acceptor includes a note, ticket, or bill acceptor 28, into which the player inserts paper money, a ticket, or voucher and a coin slot 26 into which the player inserts money, coins, or tokens. In other embodiments, payment devices such as readers or validators for credit cards, debit cards, or credit slips may accept payment. In one embodiment, a player may insert an identification card into a card reader of the gaming device. In one embodiment, the identification card is a smart card having a programmed microchip, a coded magnetic strip, or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, that communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as discussed above.

As shown in FIGS. 1A, 1B, and 2A, in one embodiment the gaming device includes at least one and preferably a plurality of input devices 30 in communication with the processor. The input devices may include any suitable device that enables the player to produce an input signal that is received by the processor. In one embodiment, after appropriate funding of the gaming device, the input device is a game activation device, such as a play button 32 or a pull arm (not shown) that is used by the player to start any primary game or sequence of events in the gaming device. The play button may be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player may increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) that enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the players electronically recordable identification card or smart card, may be implemented in accordance with the gaming device disclosed herein.

In one embodiment, as mentioned above and as shown in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player may make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as shown in FIG. 2A, the gaming device includes a sound generating device controlled by one or more sound cards 48 that function in conjunction with the processor. In one embodiment, the sound generating device includes at least one and preferably a plurality of speakers 50 or other sound generating hardware and/or software for generating sounds, such as by playing music for the base or primary wagering game and/or the bonus game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera and to display the visible manifestation of the game in split screen or picture-in-picture fashion. For example, the camera may acquire an image of the player and the processor may incorporate that image into the base or primary wagering game and/or the bonus game as a game image, symbol, or indicia.

In addition to incorporating the multiple streak game elements of the present disclosure, gaming device 10 incorporates any elements of the base or primary wagering game. The base or primary wagering game is associated with the multiple streak game. The gaming machine or device may include some or all of the features of conventional gaming machines or devices. The base or primary wagering game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different wagering games, such as video poker games, video blackjack games, video keno, video bingo, video Craps, video Sic Bo, video roulette, or any other suitable game may be implemented as the base or primary wagering game.

In one embodiment, the base or primary wagering game may be a slot game with one or more paylines. The paylines may be horizontal, vertical, circular, diagonal, angled, or any combination thereof. In this embodiment, the gaming device includes at least one and preferably a plurality of reels, such as three to five reels, in either electromechanical form with mechanical rotating reels or video form with simulated reels and movement thereof. In one embodiment, an electromechanical slot machine includes a plurality of adjacent, rotatable reels that may be combined and operably coupled with an electronic display of any suitable type. In another embodiment, if the reels are in video form, one or more of the display devices, as discussed above, displays the plurality of simulated video reels. Each reel displays a plurality of indicia or symbols, such as bells, hearts, fruits, numbers, letters, bars, or other images that preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the base or primary wagering game stop spinning if specified types and/or configurations of indicia or symbols occur on an active payline or otherwise occur in a winning pattern, occur on the requisite number of adjacent reels, and/or occur in a scatter pay arrangement.

In an alternative embodiment, rather than determining any outcome to provide to the player by analyzing the symbols generated on any wagered upon paylines as discussed above, the gaming device determines any outcome to provide to the player based on the number of associated symbols that are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e. 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if a reel is activated based on the player's wager, then each of the symbol positions of that reel will be activated and each of the active symbol positions will be part of one or more of the ways to win. In one embodiment, if a reel is not activated based on the player's wager, then a designated number of default symbol positions, such as a single symbol position of the middle row of the reel, will be activated and the default symbol position(s) will be part of one or more of the ways to win. This type of gaming machine enables a player to wager on one, more than one, or all of the reels, and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as discussed above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as discussed above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols that form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as discussed above for each of the remaining classified strings of related symbols that were previously classified or formed from related symbols on the first and second reels.

After analyzing each of the remaining strings of related symbols, the gaming device determines, for each remaining pending or incomplete string of related symbols, if any of the symbols from the next adjacent reel should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, the base or primary wagering game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table that utilizes conventional poker hand rankings to determine the winning hands. The gaming device provides the player with an award based on a winning hand and the number of credits the player wagered.

In another embodiment, the base or primary wagering game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, the base or primary wagering game may be a keno game wherein the gaming device displays a plurality of selectable indicia or numbers on at least one of the display devices. In this embodiment, the player selects at least one of a plurality of the selectable indicia or numbers via an input device such as a touch screen. The gaming device then displays a series of drawn numbers and determines an amount of matches, if any, between the player's selected numbers and the gaming device's drawn numbers. The player is provided an award based on the amount of matches, if any, based on the amount of determined matches and the number of numbers drawn.

In one embodiment, the base or primary wagering game or the multiple streak game may include a triggering event or qualifying condition that gives players the opportunity to win credits in a bonus game or in a bonus round. The bonus game enables the player to obtain a prize or payout in addition to the prize or payout, if any, obtained from the base or primary wagering game and/or the multiple streak game. In general, a or bonus game produces a significantly higher level of player excitement than the primary game because it provides a greater expectation of winning than the base or primary wagering game, and is accompanied with more attractive or unusual features than the base or primary wagering game. In one embodiment, the bonus game may be any type of suitable game, either similar to or completely different from the base or primary wagering game.

In one embodiment, the triggering event or qualifying condition may be a selected outcome in the base or primary wagering game or a particular arrangement of one or more indicia on a display device in the base or primary wagering game, such as the ball landing in the ball landing associated with the number seven on the Roulette wheel. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more bonus games. In one such embodiment, the gaming device does not provide any apparent reason to the player for qualifying to play a bonus game. In this embodiment, qualifying for a bonus game is not triggered by an event in or based specifically on any of the plays of the base or primary wagering game. That is, the gaming device may simply qualify a player to play a bonus game without any explanation or alternatively with simple explanations. In another embodiment, the gaming device (or central server) qualifies a player for a bonus game at least partially based on a game triggered or symbol triggered event, such as at least partially based on the play of the base or primary wagering game.

In one embodiment, the gaming device includes a program that will automatically begin a bonus round after the player has achieved a triggering event or qualifying condition in the base or primary wagering game. In another embodiment, after a player has qualified for a bonus game, the player may subsequently enhance his/her bonus game participation through continued play on the base or primary wagering game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the base or primary wagering game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather, the player must win or earn entry through play of the base or primary wagering game, thus encouraging play of the primary game. In another embodiment, qualification of the bonus game is accomplished through a simple "buy-in" by the player—for example, if the player has been unsuccessful at qualifying through other specified activities. In another embodiment, the player must make a separate side-wager on the bonus game or wager a designated amount in the base or primary wagering game to qualify for the bonus game. In this embodiment, the bonus game triggering event must occur and the side-wager (or designated base or primary wagering game wager amount) must have been placed to trigger the bonus game.

Figure 2B:
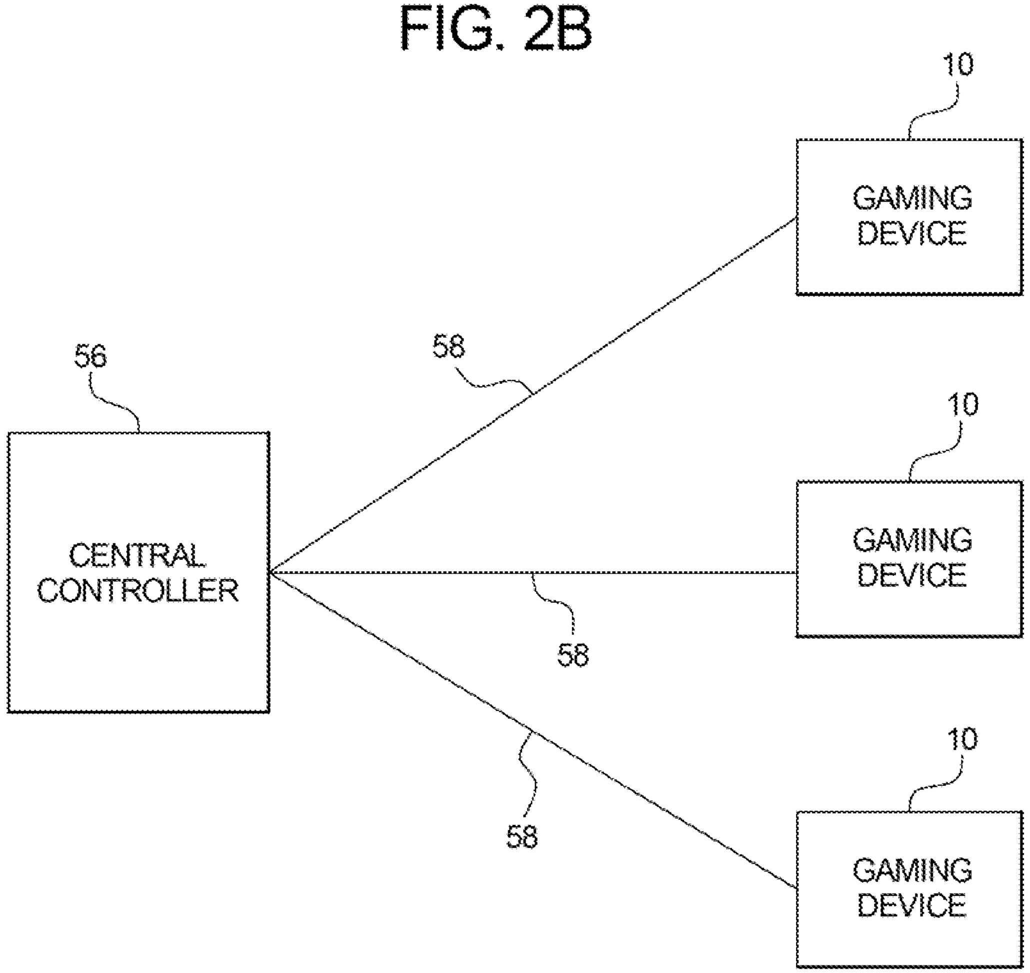
FIG. 2B is a schematic diagram of the central server in communication with a plurality of gaming devices in accordance with one embodiment of the gaming system disclosed herein.

In one embodiment, as illustrated in FIG. 2B, one or more of the gaming devices 10 are in communication with each other and/or at least one central controller 56 through a data network or remote communication link 58. In this embodiment, the central server, central controller, or remote host is any suitable server or computing device that includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more, or each of the functions of the central controller, central server, or remote host as disclosed herein may be performed by one or more gaming device processors. It should be further appreciated that one, more, or each of the functions of one or more gaming device processors as disclosed herein may be performed by the central controller, central server, or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the base or primary wagering game based on probability data. In another embodiment, the central server or controller randomly generates a game outcome for the bonus game based on probability data. In another embodiment, the central server or controller randomly generates a game outcome for both the base or primary wagering game and the bonus game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome may include a base or primary wagering game outcome, a bonus game outcome, base or primary wagering game and bonus game outcomes, or a series of game outcomes such as free games.

The central server or controller communicates the generated or selected game outcome to the initiated gaming device.

The gaming device receives the generated or selected game outcome and provides the game outcome to the player. In an alternative embodiment, how the generated or selected game outcome is to be presented or displayed to the player, such as a ball landing on a designated space in a wheel, is also determined by the central server or controller and communicated to the initiated gaming device to be presented or displayed to the player. Central production or control may assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device, in one embodiment, the bingo, keno, or lottery game is displayed to the player. In another embodiment, the bingo, keno, or lottery game is not displayed to the player, but the results of the bingo, keno, or lottery game determine the predetermined game outcome value for the base or primary wagering game or bonus game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination may be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As discussed above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10, which will be provided to a first player regardless of how the first player plays in a first game, and a second gaming device to have selected elements marked in a different predetermined pattern is provided a second outcome of win $2, which will be provided to a second player regardless of how the second player plays a second game. It should be appreciated that as the process of marking selected elements continues until one or more predetermined patterns are marked, this embodiment ensures that at least one bingo card will win the bingo game, and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as discussed above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as discussed above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card that has an encoded player identification number that uniquely identifies the player. When a player inserts the player's playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes the player's player tracking card when concluding play for that gaming session. In another embodiment, rather than requiring a player to insert a player tracking card, the gaming device utilizes one or more portable devices carried by a player, such as a cell phone, a radio frequency identification tag, or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) that are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device may be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as discussed above, one or more gaming devices are in communication with a central server or controller. The central server or controller may be any suitable server or computing device that includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game that may be played on one or more of the gaming devices in the gaming system. Such different games may include the same or substantially the same game play with different pay tables. In different embodiments, the executable game program is for a base or primary wagering game, a bonus game, or both. In another embodiment, the game program may be executable as a bonus game to be played simultaneous with the play of a base or primary wagering game (that may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g. a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary wagering game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or, alternatively, with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager that the player may make (and that may be tracked via a side-bet meter). In one embodiment, one or more of the progressive awards are funded with only side-bets or side-wagers placed. In another embodiment, one or more of the progressive awards are funded based on players' wagers as discussed above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, among the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Multiple Streak Game

Figure 3:
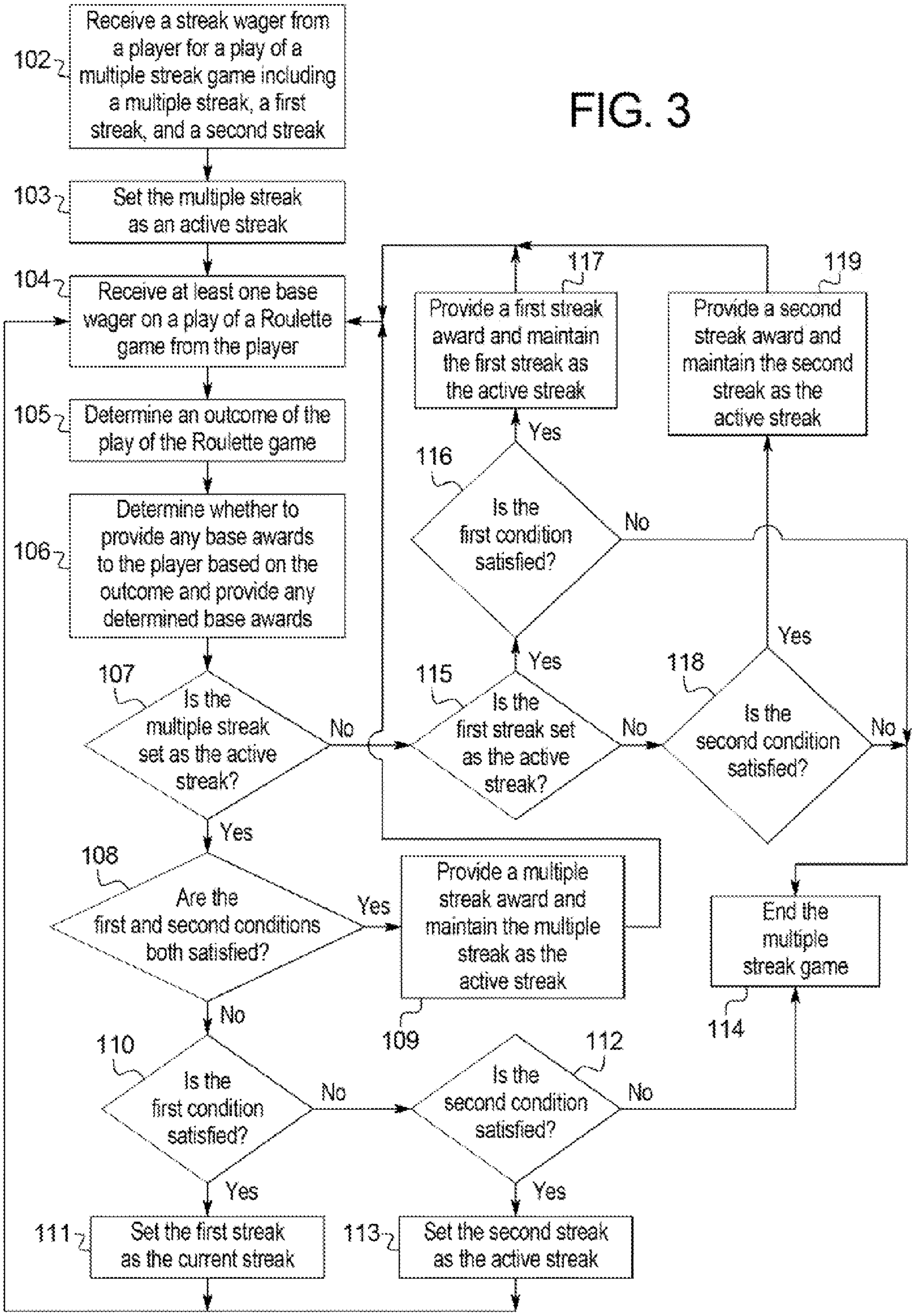
FIG. 3 is a flowchart illustrating one embodiment of a method of operating the gaming system disclosed herein.
Figure 16:
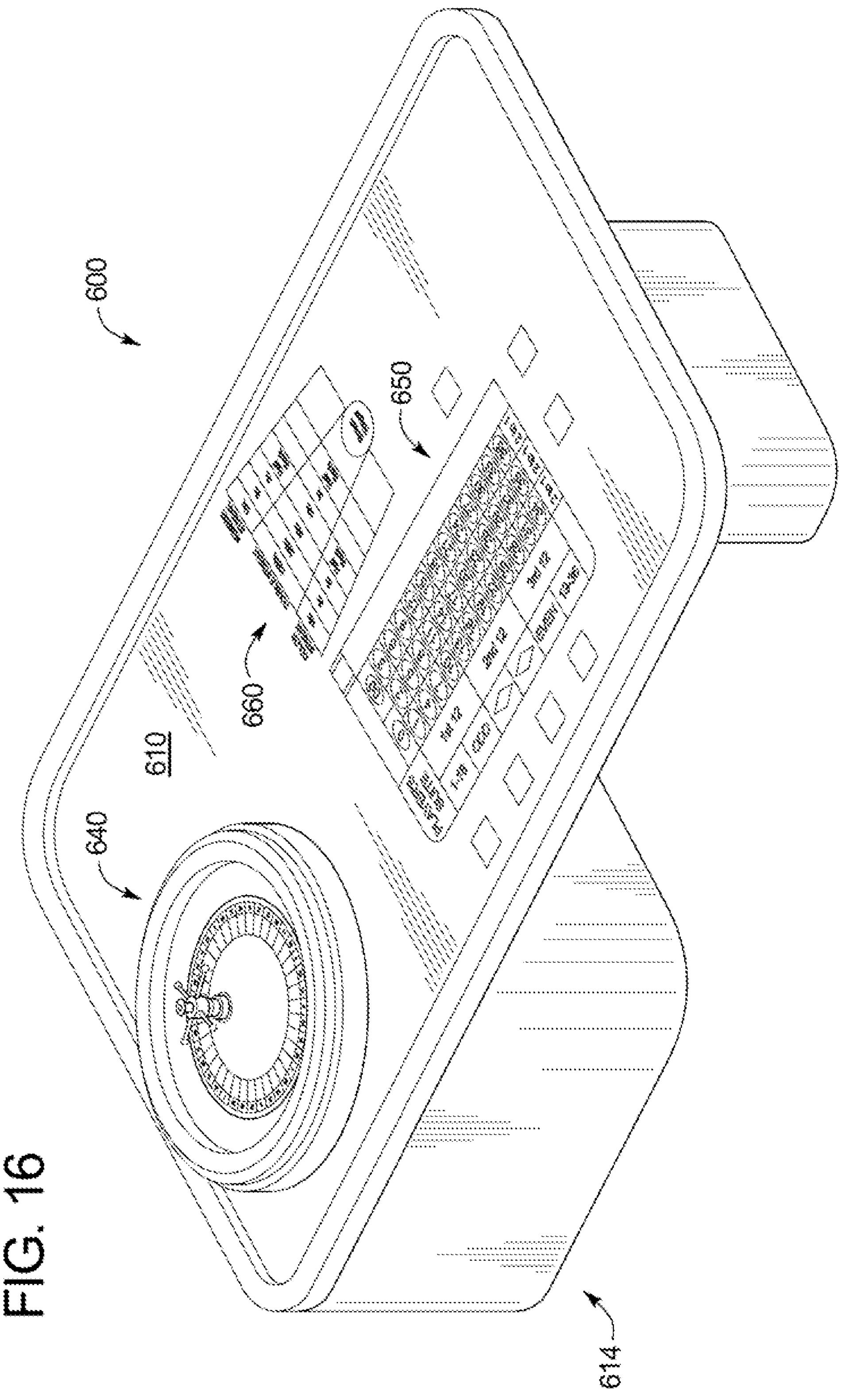
FIG. 16 illustrates a perspective view of a physical Roulette table configured to operate the multiple streak game of the present disclosure.
Figure 17:
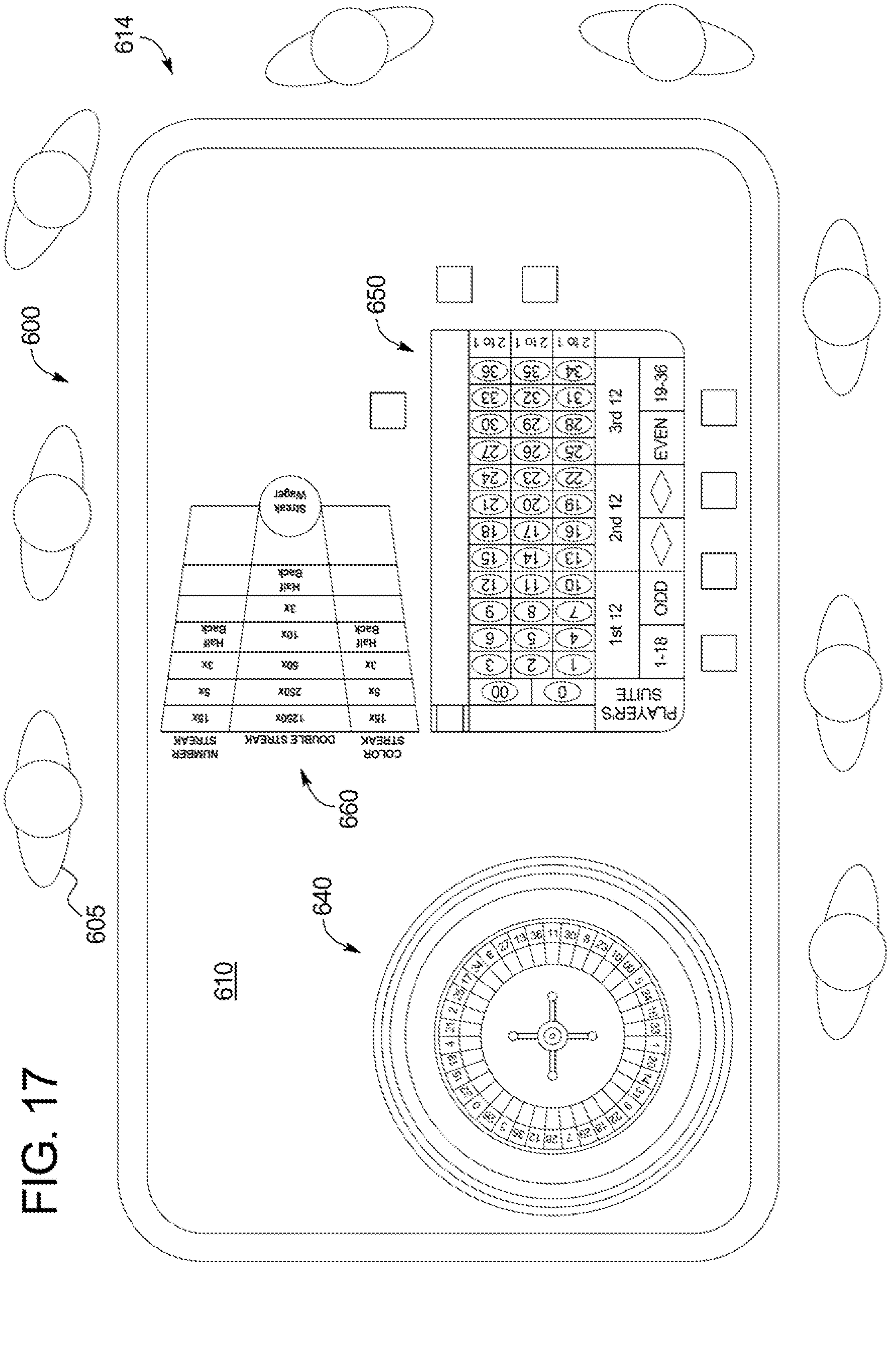
FIG. 17 illustrates a top view of the Roulette table of FIG. 16.

FIG. 3 illustrates a flowchart of one example embodiment of a process or method 100 for operating a gaming system or a gaming device including the multiple streak game of the present disclosure. In one embodiment, this process 100 is embodied in one or more software programs stored in one or more memories and executed by one or more processors or controllers. In another embodiment, the process 100 is provided over a data network such as the Internet. In another embodiment, the process 100 is performed in association with a physical Roulette wheel, as illustrated in FIGS. 16 and 17 and discussed below. Although this process 100 is described with reference to the flowchart shown in FIG. 3, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, as indicated in block 102, the gaming system receives a streak wager from a player for a play of the multiple streak game that is associated with a number of consecutive plays of a base or primary wagering game, which is a Roulette game in this embodiment. The multiple streak game includes a multiple streak, a first streak, and a second streak, as indicated in block 102. The multiple streak has a multiple streak continuation condition that is satisfied when an outcome of the Roulette game satisfies a first condition and a second condition. The first streak has a first streak continuation condition that is satisfied when an outcome of the Roulette game satisfies the first condition. The second streak has a second streak continuation condition that is satisfied when an outcome of the Roulette game satisfies the second condition. In this embodiment, the multiple streak, first streak, and second streak are different, and the first and second conditions (and, therefore, the multiple streak continuation condition, the first streak continuation condition, and the second streak continuation condition) are different. The gaming system sets the multiple streak as an active streak, as indicated in block 103. The gaming system receives at least one base wager from the player on a play of the Roulette game, as indicated in block 104. In another embodiment, block 104 is omitted from process 100 as long as the player places a streak wager. The gaming system determines an outcome of the play of the Roulette game, as indicated in block 105. The gaming system determines whether to provide any base awards to the player based on the outcome and provides any determined base awards, as indicated in block 106. The gaming system determines whether the multiple streak is set as the active streak, as indicated in diamond 107.

If the multiple streak is set as the active streak, the gaming system determines whether the outcome satisfies both the first condition and the second condition (i.e., whether outcome satisfies the multiple streak continuation condition), as indicated in diamond 108. If the outcome satisfies both the first condition and the second condition (i.e., if the outcome satisfies the multiple streak continuation condition), the gaming system provides the player with a multiple streak award (if any), maintains the multiple streak as the active streak, and returns to block 104, as indicated in block 109. If the outcome does not satisfy both the first condition and the second condition (i.e., if the outcome does not satisfy the multiple streak continuation condition), the gaming system determines whether the outcome satisfies the first condition (i.e., whether the outcome satisfies the first streak continuation condition), as indicated in diamond 110.

If the outcome satisfies the first condition (i.e., if the outcomes satisfies the first streak continuation condition), the gaming system sets the first streak as the active streak and returns to block 104, as indicated in block 111. If not, the gaming system determines whether the outcome satisfies the second condition (i.e., whether outcome satisfies the second streak continuation condition), as indicated in diamond 112.

If the outcome satisfies the second condition (i.e., if the outcome satisfies the second streak continuation condition), the gaming system sets the second streak as the active streak and returns to block 104, as indicated in block 113.

If the outcome satisfies neither the first condition nor the second condition (i.e., if the outcome satisfies neither the multiple streak continuation condition, nor the first streak continuation condition, nor the second streak continuation condition), the gaming system ends the multiple streak game, as indicated in block 114.

Returning to diamond 107, if the multiple streak is not set as the active streak, the gaming system determines whether the first streak is set as the active streak, as indicated in diamond 115. If the first streak is set as the active streak, the gaming system determines whether the outcome satisfies the first condition (i.e., whether the outcome satisfies the first streak continuation condition), as indicated in diamond 116. If the outcome satisfies the first condition (i.e., if the outcome satisfies the first streak continuation condition), the gaming system provides the player with a first streak award, maintains the first streak as the active streak, and returns to block 104, as indicated in block 117. If the outcome does not satisfy the first condition (i.e., if the outcome does not satisfy the first streak continuation condition), the gaming system ends the multiple streak game, as indicated in block 114.

If the first streak is not set as the active streak, the gaming system determines whether the outcome satisfies the second condition (i.e., whether the outcome satisfies the second streak continuation condition), as indicated in diamond 118. If the outcome satisfies the second condition (i.e., if the outcome satisfies the second streak continuation condition), the gaming system provides a second streak award, maintains the second streak as the active streak, and returns to block 104, as indicated in block 119. If the outcome does not satisfy the second condition (i.e., if the outcome does not satisfy the second streak continuation condition), the gaming system ends the multiple streak game, as indicated in block 114.

It should be appreciated that, in other embodiments, a representation of the streak wager is displayed to the player during play of the multiple streak game in a multiple streak game area, an example of which is described in detail below. The representation of the streak wager is repositioned in the multiple streak game area depending upon the streak wager's starting position and the outcome of the base or primary wagering game. In another embodiment, any streak awards are displayed to the player.

FIGS. 4, 5, 6, 7, 8, 9, 10, 11, 12, and 13 illustrate screen shots of one example embodiment of the gaming system, gaming device, and the method of operating the gaming system and gaming device of the present disclosure. The gaming system includes a display device 130 that displays the multiple streak game. The multiple streak game is associated with a number of consecutive plays of a base or primary wagering game (or, in other embodiments, a non-wagering game) that has a plurality of different outcomes. In this embodiment, Roulette is the base or primary wagering game with which the multiple streak game is associated. Thus, when a player places a streak wager, the multiple streak game will be is associated with a number of consecutive plays of the Roulette game. Here, the multiple streak game includes a multiple streak, a first streak, and a second streak. The multiple streak has a multiple streak continuation condition that, in this embodiment, is satisfied when one of the different outcomes of the Roulette game satisfies each of a first condition and a second condition. The first streak has a first streak continuation condition that is satisfied when one of the different outcomes of the Roulette game satisfies the first condition. The second streak has a second streak continuation condition that is satisfied when one of the different outcomes of the Roulette game satisfies the second condition.

Thus, in this embodiment the multiple streak game includes one multiple streak, which is a streak having a continuation condition that is satisfied when an outcome of the base or primary wagering game satisfies each of a plurality of conditions. Further, this embodiment of the multiple streak game includes two single streaks, which are streaks having continuation conditions that are satisfied when an outcome of the base or primary wagering game satisfies a single condition.

It should be appreciated that the multiple streak game may include any suitable combination of multiple streaks and/or single streaks. It should further be appreciated that the multiple streak game may include any suitable quantity of streaks. In one example, the multiple streak game includes: (a) a multiple streak having a continuation condition that is satisfied when an outcome of the base or primary wagering game satisfies each of two conditions, and (b) a single streak having a continuation condition that is satisfied when an outcome of the base or primary wagering game satisfies one condition. In another example, the multiple streak game includes: (a) a multiple streak having a continuation condition that is satisfied when an outcome of the base or primary wagering game satisfies each of three conditions, and (b) a single streak having a continuation condition that is satisfied when an outcome of the base or primary wagering game satisfies one condition. In another example, the multiple streak game includes: (a) a multiple streak having a continuation condition that is satisfied when an outcome of the base or primary wagering game satisfies each of three conditions, and (b) a multiple streak having a continuation condition that is satisfied when an outcome of the base or primary wagering game satisfies each of two conditions. In another example, the multiple streak game includes: (a) a multiple streak having a continuation condition that is satisfied when an outcome of the base or primary wagering game satisfies each of two conditions, and (b) two single streaks having continuation conditions that are satisfied when an outcome of the base or primary wagering game satisfies one condition. In another example, the multiple streak game includes: (a) a multiple streak having a continuation condition that is satisfied when an outcome of the base or primary wagering game satisfies each of three conditions, and (b) two multiple streaks having continuation conditions that are satisfied when an outcome of the base or primary wagering game each of two one conditions. In another example, the multiple streak game includes: (a) a multiple streak having a continuation condition that is satisfied when an outcome of the base or primary wagering game satisfies each of three conditions, (b) a multiple streak having a continuation condition that is satisfied when an outcome of the base or primary wagering game satisfies each of two conditions, and (c) a single streak having a continuation condition that is satisfied when an outcome of the base or primary wagering game satisfies one condition. In another example, the multiple streak game includes: (a) a multiple streak having a continuation condition that is satisfied when an outcome of the base or primary wagering game satisfies each of three conditions, (b) two multiple streaks having continuation conditions that are satisfied when an outcome of the base or primary wagering game satisfies each of two conditions, and (c) two single streaks having continuation conditions that are satisfied when an outcome of the base or primary wagering game satisfies one condition.

In this embodiment, the multiple streak is dependent upon the first streak because an outcome of the base or primary wagering game must satisfy the first condition in order to satisfy both the multiple streak continuation condition and the first continuation condition. Similarly, the multiple streak is dependent upon the second streak because an outcome of the base or primary wagering game must satisfy the second condition in order to satisfy both the multiple streak continuation condition and the second streak continuation condition. It should be appreciated that in other embodiments some or all of the streaks may be independent from one another. For example, each of the conditions that an outcome of the base or primary wagering game must satisfy to satisfy the continuation condition of each streak may be different. In one of these example embodiments including a multiple streak and a first streak, the multiple streak continuation condition is satisfied when an outcome of the base or primary wagering game satisfies each of a first condition and a second condition, and the first streak continuation condition is satisfied when an outcome of the base or primary wagering game satisfies a third different condition.

The display device 130 displays a multiple streak game area or indicator 160. The multiple streak game area 160 includes a first streak ladder 170, a second streak ladder 190, and a multiple streak ladder 180. The first streak ladder 170 includes first ladder positions 171, 172, 173, 174, 175, 176, and 177. The second streak ladder 190 includes second streak ladder positions 191, 192, 193, 194, 195, 196, and 197. The multiple streak ladder 180 includes multiple streak ladder positions 181, 182, 183, 184, 185, 186, and 187. The multiple streak game area 160 also includes an initial streak wager position 162. It should be appreciated that the first, second, and multiple streak ladders may include any suitable quantity of ladder positions.

A plurality of the first, second, and multiple streak ladder positions are associated with or include a streak award, such as: a Half Back streak award, labeled 161; a 3× streak award, labeled 163; a 5× streak award, labeled 164; a 10× streak award, labeled 165; a 15× streak award, labeled 166; a 50× streak award, labeled 167; a 250× streak award, labeled 168; and a 1250× streak award, labeled 169. For clarity and brevity, the Half Back 161, 3× 163, 5× 164, 10× 165, 15× 166, 50× 167, 250× 168 and 1250× 169 streak awards are sometimes referred to herein as the Half Back, 3×, 5×, 10×, 15×, 50×, 50×, 250×, and 1250× streak awards. It should be appreciated that the multiple streak game may include any suitable type of awards, such as, but not limited to, credit or monetary awards, comp awards, non-credit or non-monetary awards, and award multipliers.

In this illustrated embodiment, first streak ladder position 174, second streak ladder position 194, and multiple streak ladder position 182 are associated with the Half Back streak award. First streak ladder position 175, second streak ladder position 175, and multiple streak ladder position 183 are associated with the 3× streak award. First streak ladder position 176 and second streak ladder position 196 are associated with the 5× streak award. Multiple streak ladder position 184 is associated with the 10× streak award. First streak ladder position 177 and second streak ladder position 197 are associated with the 15× streak award. Multiple streak ladder position 185 is associated with the 50× streak award. Multiple streak ladder position 186 is associated with the 250× streak award. Multiple streak ladder position 187 is associated with the 1250× streak award. It should also be appreciated that awards may be associated with any, all, a plurality of, or at least one of the ladder positions.

In this illustrated embodiment, the multiple streak, the first streak, and the second streak are set by the gaming system prior to a player's first play of the Roulette game in association with the player's streak wager. Specifically, the multiple streak is set as a DOUBLE STREAK, the first streak is set as a COLOR STREAK, and the second streak is set as a NUMBER STREAK. The COLOR STREAK is associated with whether the outcome of the Roulette game is RED or BLACK. The NUMBER STREAK is associated with whether the outcome of the Roulette game is ODD or EVEN. The DOUBLE STREAK is associated with whether the outcome of the Roulette game is RED or BLACK and whether the outcome is ODD or EVEN. Accordingly, with respect to this illustrated embodiment, the multiple streak continuation condition is referred to as the DOUBLE STREAK continuation condition, the first streak continuation condition is referred to as the COLOR STREAK continuation condition, and the second streak continuation condition is referred to as the NUMBER STREAK continuation condition. In another embodiment, the NUMBER STREAK is instead referred to as a PARITY STREAK.

The first streak area 170, second streak area 190, and multiple streak area 180 are referred to herein with respect to this illustrated embodiment as COLOR STREAK area 170, NUMBER STREAK area 190, and DOUBLE STREAK area 180. Additionally, with respect to this illustrated embodiment, first streak ladder positions 171, 172, 173, 174, 175, 176, and 177 are referred to as COLOR STREAK ladder positions 171, 172, 173, 174, 175, 176, and 177; second streak ladder positions 191, 192, 193, 194, 195, 196, and 197 are referred to as NUMBER STREAK ladder positions 191, 192, 193, 194, 195, 196, and 197; and multiple streak ladder positions 181, 182, 183, 184, 185, 186, and 187 are referred to as DOUBLE STREAK ladder positions 181, 182, 183, 184, 185, 186, and 187.

It should be appreciated that the gaming system may set the first, second, and multiple streaks such that the first, second, and multiple streaks, and their respective continuation conditions (discussed below), are associated with any suitable condition of an outcome of the Roulette game such as, but not limited to: (a) an outcome within the first twelve numbers (i.e., first third), (b) an outcome within the second twelve numbers (i.e., second third), (c) an outcome within the third twelve numbers (i.e. third third), (d) an outcome within the first eighteen numbers (i.e., high), (e) an outcome within the second eighteen numbers (i.e., low), (f) an outcome within a player-selected set of numbers (i.e., number range), (g) an outcome within a randomly-selected set of numbers (i.e., number range), (h) a double zero or zero outcome, (i) a green color outcome, and (j) any combination of (a) through (i).

The display device 130 displays a Roulette wheel 140 and a corresponding Roulette betting layout 150. In this illustrated embodiment the Roulette wheel 140 is a standard American Roulette wheel, and the Roulette betting layout 150 is a standard American Roulette betting layout. It should be appreciated that the Roulette game may be any suitable Roulette game, such as European Roulette.

The display device 130 displays a base wager display area 122, which is configured to display any base wagers placed by a player a base award display area 123, which is configured to display any base awards won by the player; a streak wager display area 124, which is configured to display any active streak wagers placed by the player; a streak award display area 125, which is configured to display any streak awards won by the player; and an indication or dialog box 128, which displays instructions or comments related to the multiple streak game during, before, and/or after play of the multiple streak game. It should be appreciated that, in certain embodiments, the display device displays none or a plurality of the base wager indicator, the base award indicator, the streak wager indicator, the streak award indicator, and the indication box.

Figure 4:
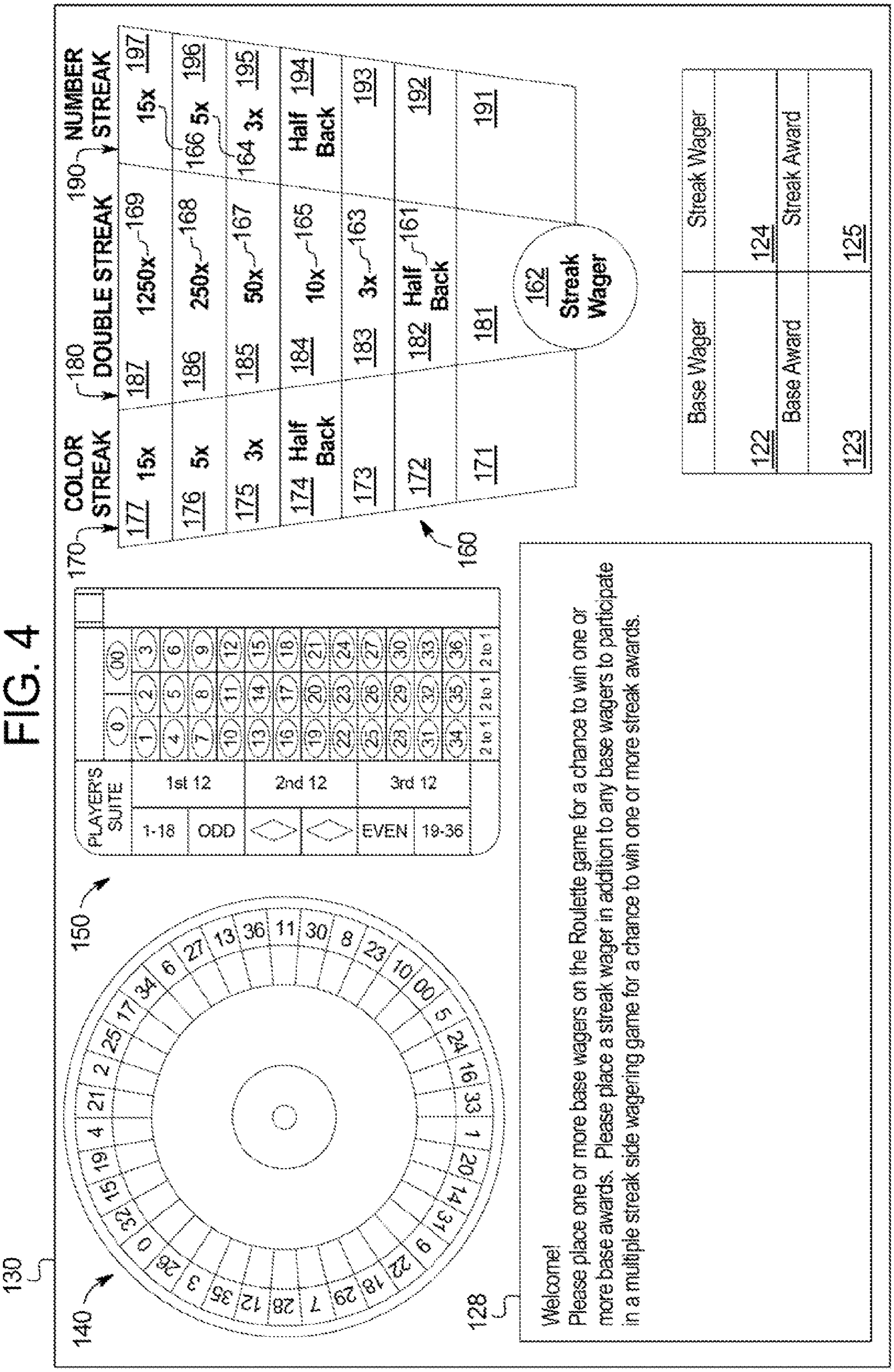
FIG. 4 is a front elevational view of a screen shot of one embodiment of a display device of the gaming system of the present disclosure including a welcome or attract screen.

As illustrated in FIG. 4, when the gaming system is not being played by a player, the display device 130 displays an attract screen that includes a welcome message in the indication box 128. The welcome message invites a player to place one or more base wagers on the Roulette game for a chance to win one or more base awards and a streak wager in addition to the base wager(s) to participate in a multiple streak game for a chance to win one or more streak awards.

Figure 5:
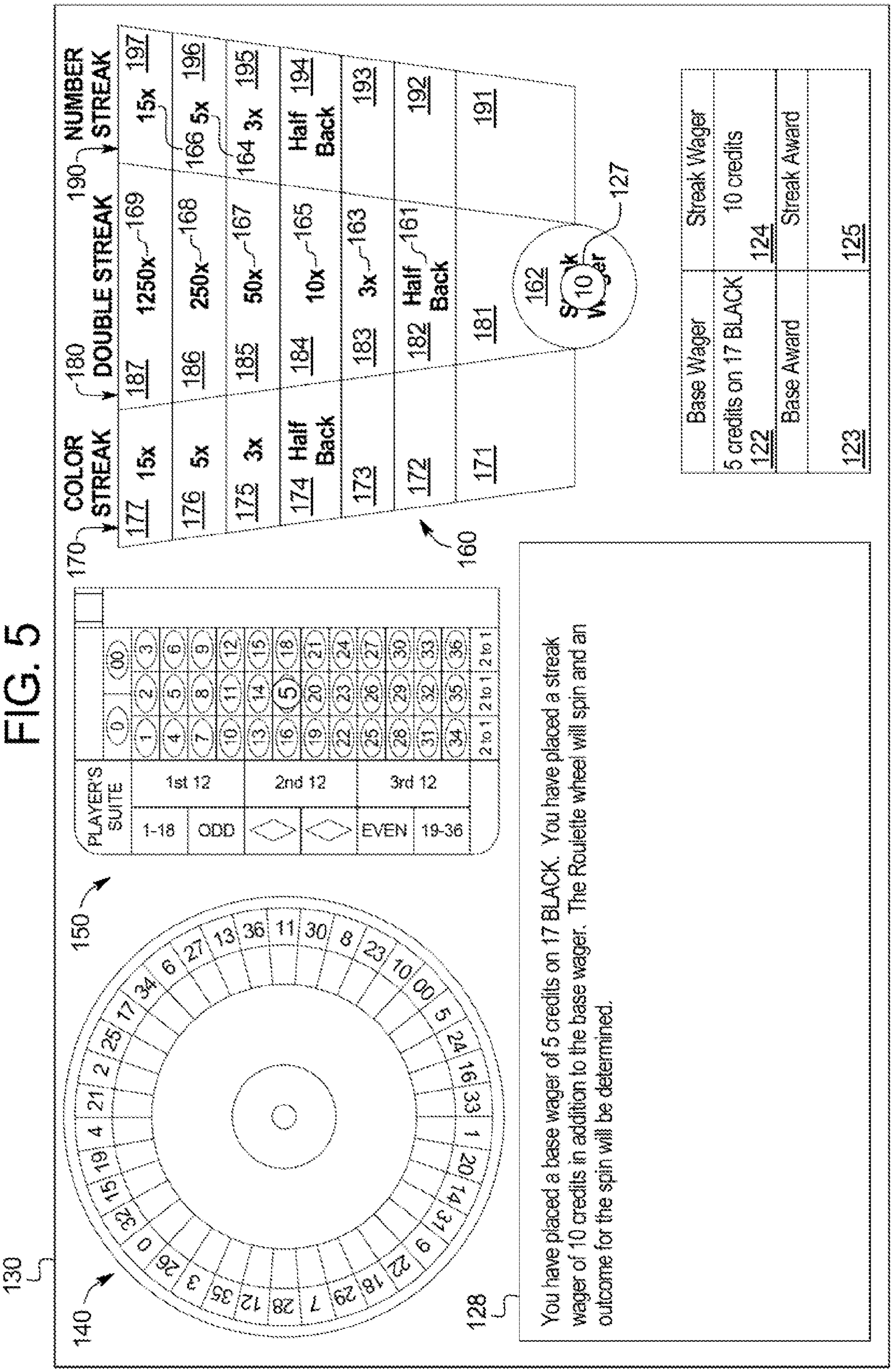
FIG. 5 is a front elevational view of a screen shot of the display device of FIG. 4 including a notification to a player that the player has placed a base wager and a streak wager and that an outcome for a play of a Roulette game will be determined.

As illustrated in FIG. 5, the player has placed a base wager of 5 credits on the outcome 17 BLACK of the Roulette game. The base wager display area 122 displays this base wager. The player has also placed a streak wager of 10 credits on the multiple streak game. The streak wager display area 124 displays this streak wager. Further, a streak wager indicator 127, which is labeled with the number 10 to correspond to the streak wager of 10 credits, is displayed on the initial streak wager position 162. In this embodiment, when a player places a streak wager, an active streak associated with that streak wager is set as the multiple streak, which is the DOUBLE STREAK in this embodiment.

Figure 6:
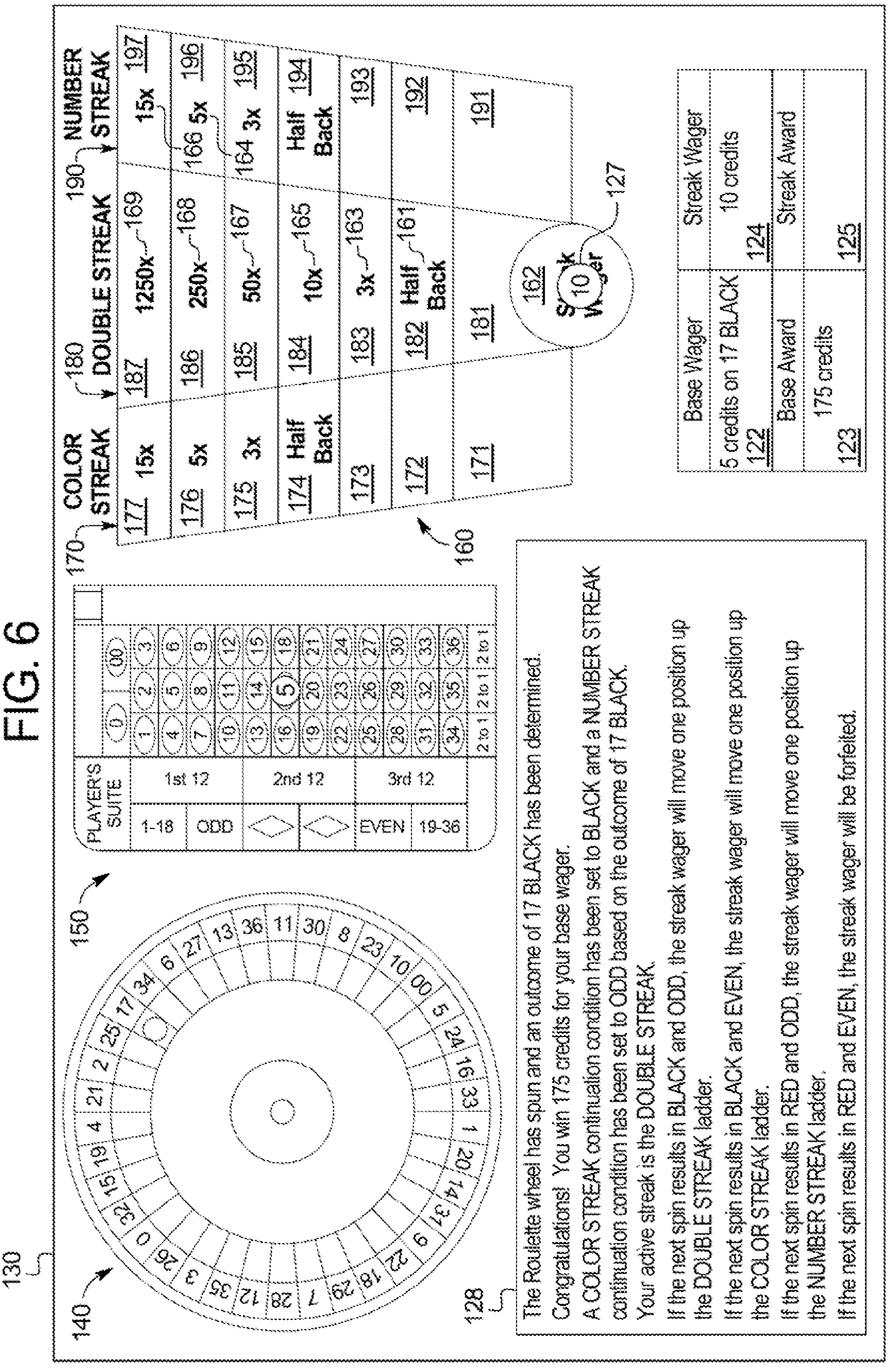
FIG. 6 is a front elevational view of a screen shot of the display device of FIG. 4 including notifications: that the player has won a base award, that continuation conditions associated with the multiple streak game have been set, and of the potential outcomes following the next spin of the Roulette wheel.

As illustrated in FIG. 6, the gaming system displays a spin of the Roulette wheel 140 and randomly generates and displays the 17 BLACK outcome. Since the player placed the base wager of 5 credits on the 17 BLACK outcome, the player wins a base award of 175 credits associated with the base wager and the 17 BLACK outcome. The base award is displayed in the base award display area 123.

In this embodiment, the DOUBLE STREAK, COLOR STREAK, and NUMBER STREAK continuation conditions are set based on the 17 BLACK outcome. Since in this embodiment the DOUBLE STREAK, COLOR STREAK, and NUMBER STREAK continuation conditions are each defined based on the first and second conditions, the first and second conditions are set based on the outcome of the first play of the Roulette game following the player's placement of the streak wager.

Specifically, in this illustrated embodiment, the first condition is set as the color of this outcome of the Roulette game, and the second condition is set as the even or odd condition of this outcome of the Roulette game. Accordingly, the first condition is set to BLACK and the second condition is set to ODD. This means that the DOUBLE STREAK continuation condition is satisfied when an outcome of the Roulette game is BLACK and ODD, the COLOR STREAK continuation condition is satisfied when an outcome of the Roulette game is BLACK, and the NUMBER STREAK continuation condition is satisfied when an outcome of the Roulette game is ODD. In this embodiment, once the COLOR STREAK, NUMBER STREAK, and DOUBLE STREAK continuation conditions are set (i.e., once the first and second conditions have been set based on the play of the Roulette game), they do not change during play of the multiple streak game.

As displayed in the indication box 128, since the DOUBLE STREAK is set as the active streak: (a) if the outcome of the next spin of the Roulette wheel satisfies the DOUBLE STREAK continuation condition (i.e., is a BLACK and ODD outcome), the streak wager indicator 127 moves one position up the DOUBLE STREAK ladder 180 to DOUBLE STREAK ladder position 181 and the DOUBLE STREAK is maintained as the active streak; (b) if the outcome of the next spin of the Roulette wheel does not satisfy the DOUBLE STREAK continuation condition but satisfies the COLOR STREAK continuation condition (i.e., is a BLACK and EVEN outcome), the streak wager indicator 127 moves one position up the COLOR STREAK ladder 170 to the COLOR STREAK ladder position 171 and the COLOR STREAK is set as the active streak; (c) if the outcome of the next spin of the Roulette wheel does not satisfy the DOUBLE STREAK continuation condition but satisfies the NUMBER STREAK continuation condition (i.e., is a RED and ODD outcome), the streak wager indicator 127 moves one position up the NUMBER STREAK ladder 190 to the NUMBER STREAK ladder position 191 and the NUMBER STREAK is set as the active streak; and (d) if the outcome of the next spin of the Roulette wheel satisfies neither the DOUBLE STREAK nor the COLOR STREAK nor the NUMBER STREAK continuation condition (i.e., is a RED and EVEN outcome), the streak wager is forfeited and the multiple streak game ends.

This embodiment of the multiple streak game is associated with a number of consecutive plays of the base or primary wagering game. This means that each play of the base or primary wagering game that occurs after the streak wager is placed is associated with the multiple streak game until the multiple streak game ends. It should be appreciated that, in other embodiments, the multiple streak game is associated with non-consecutive plays or a combination of consecutive and non-consecutive plays of the base or primary wagering game. In one example embodiment, the multiple streak game is associated with every other play of the base or primary wagering game. This means that the plays of the base or primary wagering game occurring in between those associated with the multiple streak game do not affect the multiple streak game.

In this embodiment a player is required to place a base wager on the first play of the Roulette game following the placement of the streak wager, and is not required to place a base wager on any subsequent consecutive plays of the Roulette game associated with the multiple streak game, in other words, once the player places the base wager for the play of the Roulette game that determines the continuation conditions (i.e., the first play of the Roulette game following the placement of the streak wager), the player is not required to place wagers on the subsequent consecutive plays of the Roulette game that are associated with the multiple streak game (although the player may do so). In other embodiments, the player is required to place a base wager for each of the plays of the base or primary wagering game associated with the multiple streak game. If the player does not, the streak wager is forfeited and the multiple streak game ends. In another embodiment, after placing a streak wager the player must pre-pay a certain number of base wagers for plays of the base or primary wagering game associated with the streak wager. In one of these embodiments, the player must pre-pay a base wager for each possible play of the base or primary wagering game associated with the streak wager. For example, if the longest streak ladder includes seven streak ladder positions, the player must place seven base wagers, one for each of the seven plays of the base or primary wagering game associated with the multiple streak game. In another embodiment, a player need not place a base wager in addition to placing a streak wager to play the multiple streak game, though base wagers may optionally be placed. In other embodiments, a player cannot place base game wagers, but may place one or more streak wagers. In certain embodiments, a back-betting mechanism is used, which enables players not sitting at a given Roulette table to place one or more streak wagers associated with the outcomes generated by that Roulette table. In one of these embodiments, a given player can place a base and/or streak wager on the outcomes generated by two or more independent Roulette wheels.

Figure 7:
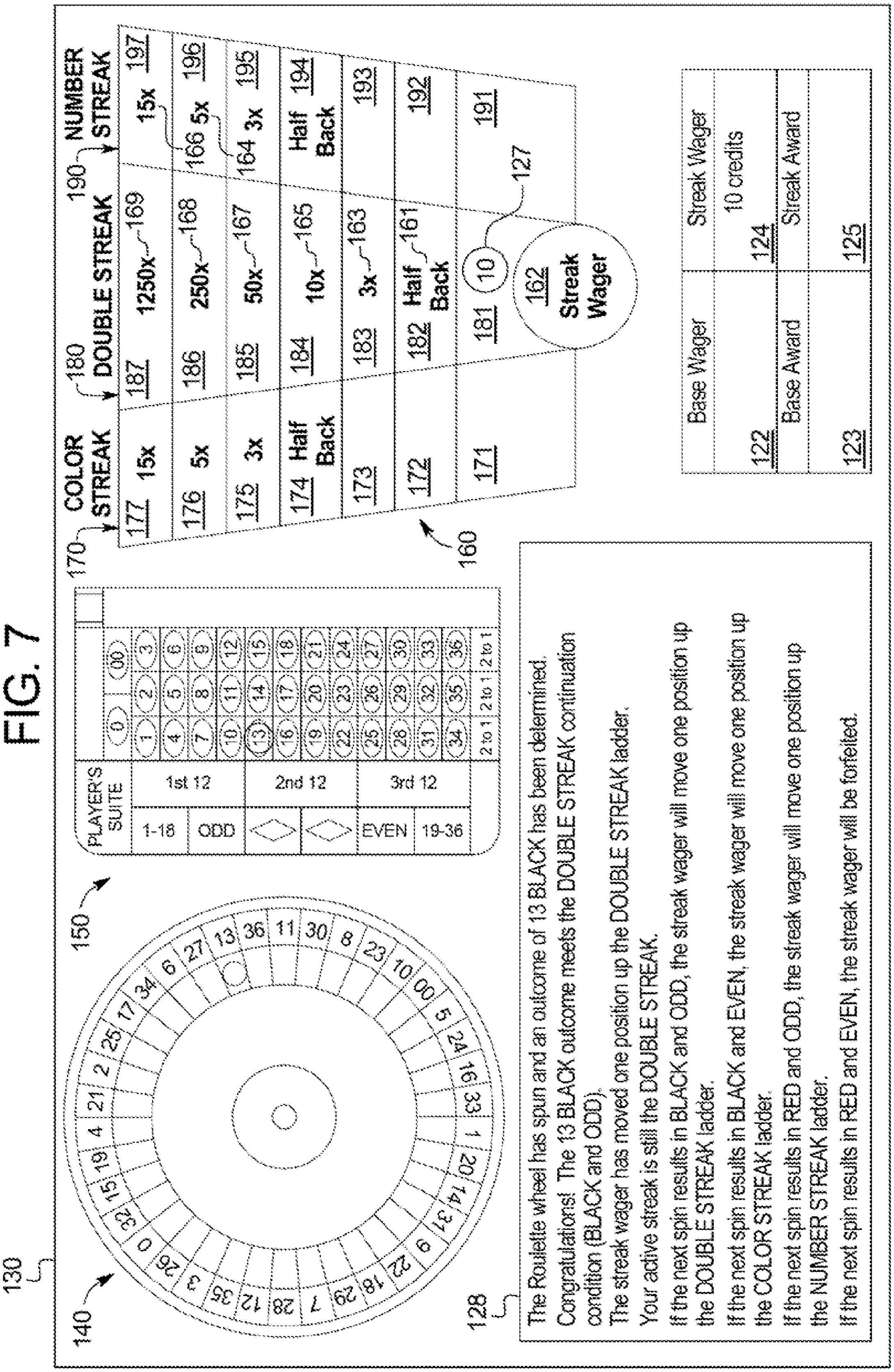
FIG. 7 is a front elevational view of a screen shot of the display device of FIG. 4 including notifications: that the outcome of the Roulette game satisfies the DOUBLE STREAK continuation condition, that the DOUBLE STREAK is maintained as the active streak, and of the potential outcomes following the next spin of the Roulette wheel.

As illustrated in FIG. 7, the gaming system displays a spin of the Roulette wheel 140 and randomly generates and displays the 13 BLACK outcome. Since the 13 BLACK outcome satisfies the DOUBLE STREAK continuation condition (i.e. is a BLACK and ODD outcome), and since the DOUBLE STREAK is set as the active streak, the streak wager indicator 127 moves one position up the DOUBLE STREAK ladder 180 to DOUBLE STREAK ladder position 181. Further, since the 13 BLACK outcome satisfies that DOUBLE STREAK continuation condition, the DOUBLE STREAK is maintained as the active streak.

As displayed in the indication box 128, since the DOUBLE STREAK is maintained as the active streak: (a) if the outcome of the next spin of the Roulette wheel satisfies the DOUBLE STREAK continuation condition (i.e., is a BLACK and ODD outcome), the streak wager indicator 127 moves one position up the DOUBLE STREAK ladder 180 to DOUBLE STREAK ladder position 182 and the DOUBLE STREAK is maintained as the active streak; (b) if the outcome of the next spin of the Roulette wheel does not satisfy the DOUBLE STREAK continuation condition but satisfies the COLOR STREAK continuation condition (i.e., is a BLACK and EVEN outcome), the streak wager indicator 127 moves one position up the COLOR STREAK ladder 170 to the COLOR STREAK ladder position 172 and the COLOR STREAK is set as the active streak; (c) if the outcome of the next spin of the Roulette wheel does not satisfy the DOUBLE STREAK continuation condition but satisfies the NUMBER STREAK continuation condition (i.e., is a RED and ODD outcome), the streak wager indicator 127 moves one position up the NUMBER STREAK ladder 190 to the NUMBER STREAK ladder position 192 and the NUMBER STREAK is set as the active streak; and (d) if the outcome of the next spin of the Roulette wheel satisfies neither the DOUBLE STREAK nor the COLOR STREAK nor the NUMBER STREAK continuation condition (i.e., is a RED and EVEN outcome), the streak wager is forfeited and the multiple streak game ends.

Figure 8:
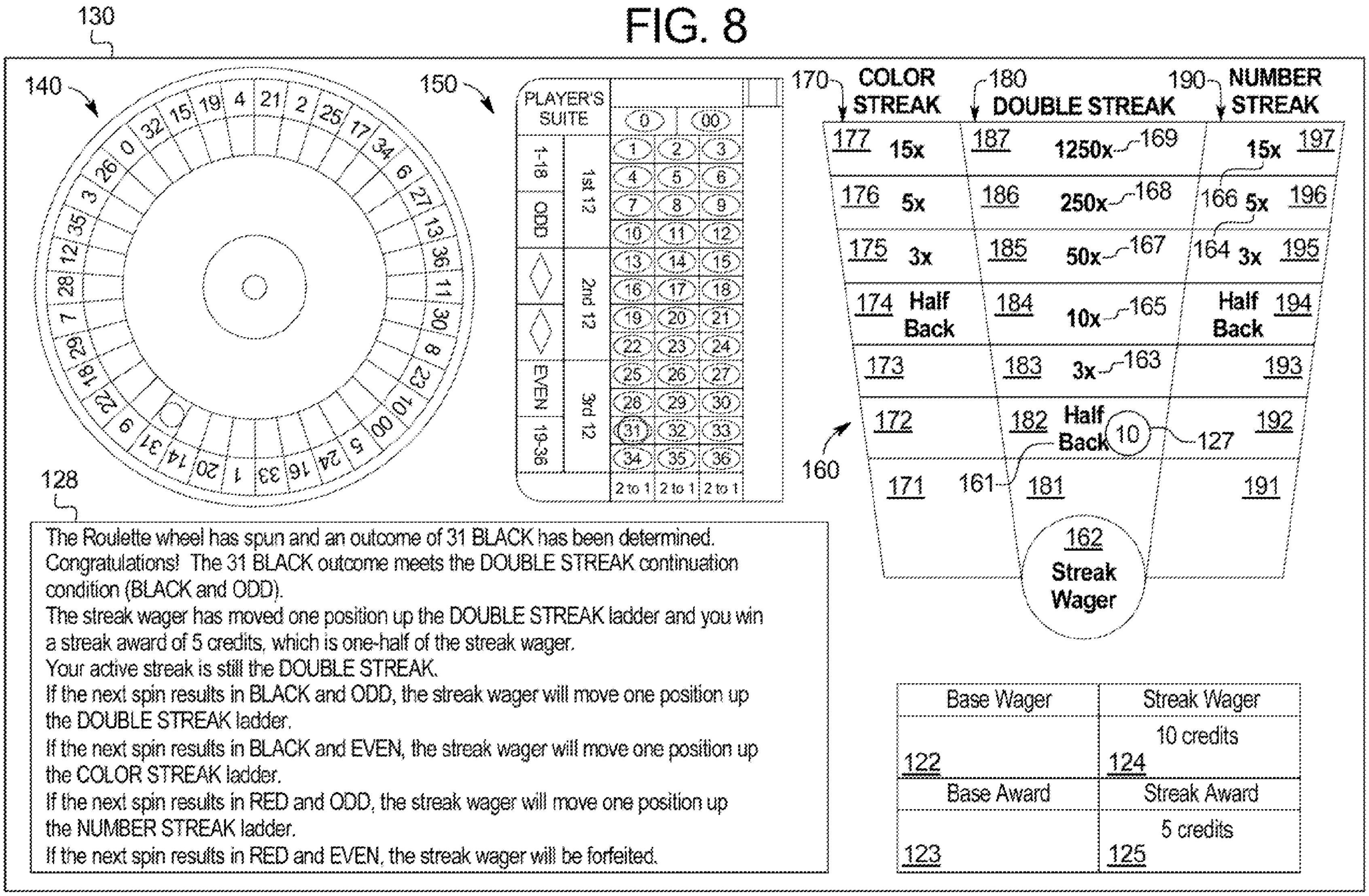
FIG. 8 is a front elevational view of a screen shot of the display device of FIG. 4 including notifications: that the outcome of the Roulette game satisfies the DOUBLE STREAK continuation condition, that the player wins a streak award, that the DOUBLE STREAK is maintained as the active streak, and of the potential outcomes following the next spin of the Roulette wheel.

As illustrated in FIG. 8, the gaming system displays a spin of the Roulette wheel 140 and randomly generates and displays the 31 BLACK outcome. Since the 31 BLACK outcome satisfies the DOUBLE STREAK continuation condition (i.e., is a BLACK and ODD outcome), and since the DOUBLE STREAK is set as the active streak, the streak wager indicator 127 moves one position up the DOUBLE STREAK ladder 180 to DOUBLE STREAK ladder position 182. Since DOUBLE STREAK ladder position 182 is associated with the Half Back streak award, the player wins a streak award of 5 credits, which is one half of the streak wager of 10 credits. The streak wager display area 125 displays the streak award of 5 credits. In this embodiment, the player is provided with the streak award when the player wins the award; in other words, the player is provided with the streak award prior to the next spin of the Roulette wheel. Thus, the player is provided with 5 credits.

Since the 31 BLACK outcome satisfies the DOUBLE STREAK continuation condition, the DOUBLE STREAK is maintained as the active streak. As displayed in the indication box 128, since the DOUBLE STREAK is maintained as the active streak: (a) if the outcome of the next spin of the Roulette wheel satisfies the DOUBLE STREAK continuation condition (i.e., is a BLACK and ODD outcome), the streak wager indicator 127 moves one position up the DOUBLE STREAK ladder 180 to DOUBLE STREAK ladder position 183 and the DOUBLE STREAK is maintained as the active streak; (b) if the outcome of the next spin of the Roulette wheel does not satisfy the DOUBLE STREAK continuation condition but satisfies the COLOR STREAK continuation condition (i.e., is a BLACK and EVEN outcome), the streak wager indicator 127 moves one position up the COLOR STREAK ladder 170 to the COLOR STREAK ladder position 173 and the COLOR STREAK is set as the active streak; (c) if the outcome of the next spin of the Roulette wheel does not satisfy the DOUBLE STREAK continuation condition but satisfies the NUMBER STREAK continuation condition (i.e., is a RED and ODD outcome), the streak wager indicator 127 moves one position up the NUMBER STREAK ladder 190 to the NUMBER STREAK ladder position 193 and the NUMBER STREAK is set as the active streak; and (d) if the outcome of the next spin of the Roulette wheel satisfies neither the DOUBLE STREAK nor the COLOR STREAK nor the NUMBER STREAK continuation condition (i.e., is a RED and EVEN outcome), the streak wager is forfeited and the multiple streak game ends.

Figure 9:
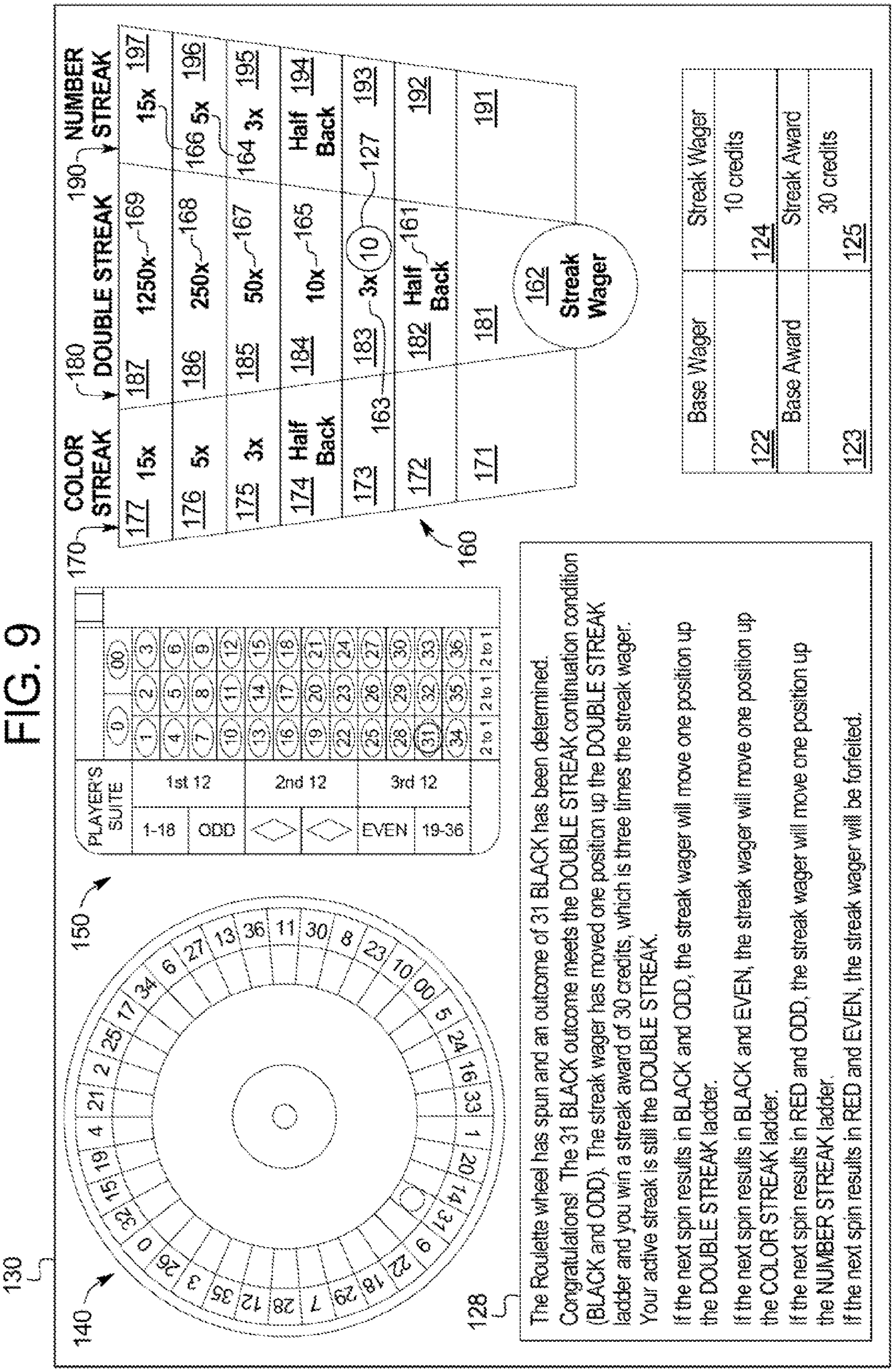
FIG. 9 is a front elevational view of a screen shot of the display device of FIG. 4 including notifications: that the outcome of the Roulette game satisfies the DOUBLE STREAK continuation condition, that the player wins a streak award, that the DOUBLE STREAK is maintained as the active streak, and of the potential outcomes following the next spin of the Roulette wheel.

As illustrated in FIG. 9, the gaming system displays a spin of the Roulette wheel 140 and randomly generates and displays the 31 BLACK outcome. Since the 31 BLACK outcome satisfies the DOUBLE STREAK continuation condition (i.e., is a BLACK and ODD outcome), and since the DOUBLE STREAK is set as the active streak, the streak wager indicator 127 moves one position up the DOUBLE STREAK ladder 180 to DOUBLE STREAK ladder position 183. Since DOUBLE STREAK ladder position 183 is associated with the 3× streak award, the player wins a streak award of 30 credits, which is three times the streak wager of 10 credits. The streak wager display area 125 displays the streak award of 30 credits. The player is provided with 30 credits.

Since the 31 BLACK outcome satisfies the DOUBLE STREAK continuation condition, the DOUBLE STREAK is maintained as the active streak. As displayed in the indication box 128, since the DOUBLE STREAK is maintained as the active streak: (a) if the outcome of the next spin of the Roulette wheel satisfies the DOUBLE STREAK continuation condition (i.e., is a BLACK and ODD outcome), the streak wager indicator 127 moves one position up the DOUBLE STREAK ladder 180 to DOUBLE STREAK ladder position 184 and the DOUBLE STREAK is maintained as the active streak; (b) if the outcome of the next spin of the Roulette wheel does not satisfy the DOUBLE STREAK continuation condition but satisfies the COLOR STREAK continuation condition (i.e. is a BLACK and EVEN outcome), the streak wager indicator 127 moves one position up the COLOR STREAK ladder 170 to the COLOR STREAK ladder position 174 and the COLOR STREAK is set as the active streak; (c) if the outcome of the next spin of the Roulette wheel does not satisfy the DOUBLE STREAK continuation condition but satisfies the NUMBER STREAK continuation condition (i.e., is a RED and ODD outcome), the streak wager indicator 127 moves one position up the NUMBER STREAK ladder 190 to the NUMBER STREAK ladder position 194 and the NUMBER STREAK is set as the active streak; and (d) if the outcome of the next spin of the Roulette wheel satisfies neither the DOUBLE STREAK nor the COLOR STREAK nor the NUMBER STREAK continuation condition (i.e., is a RED and EVEN outcome), the streak wager is forfeited and the multiple streak game ends.

Figure 10:
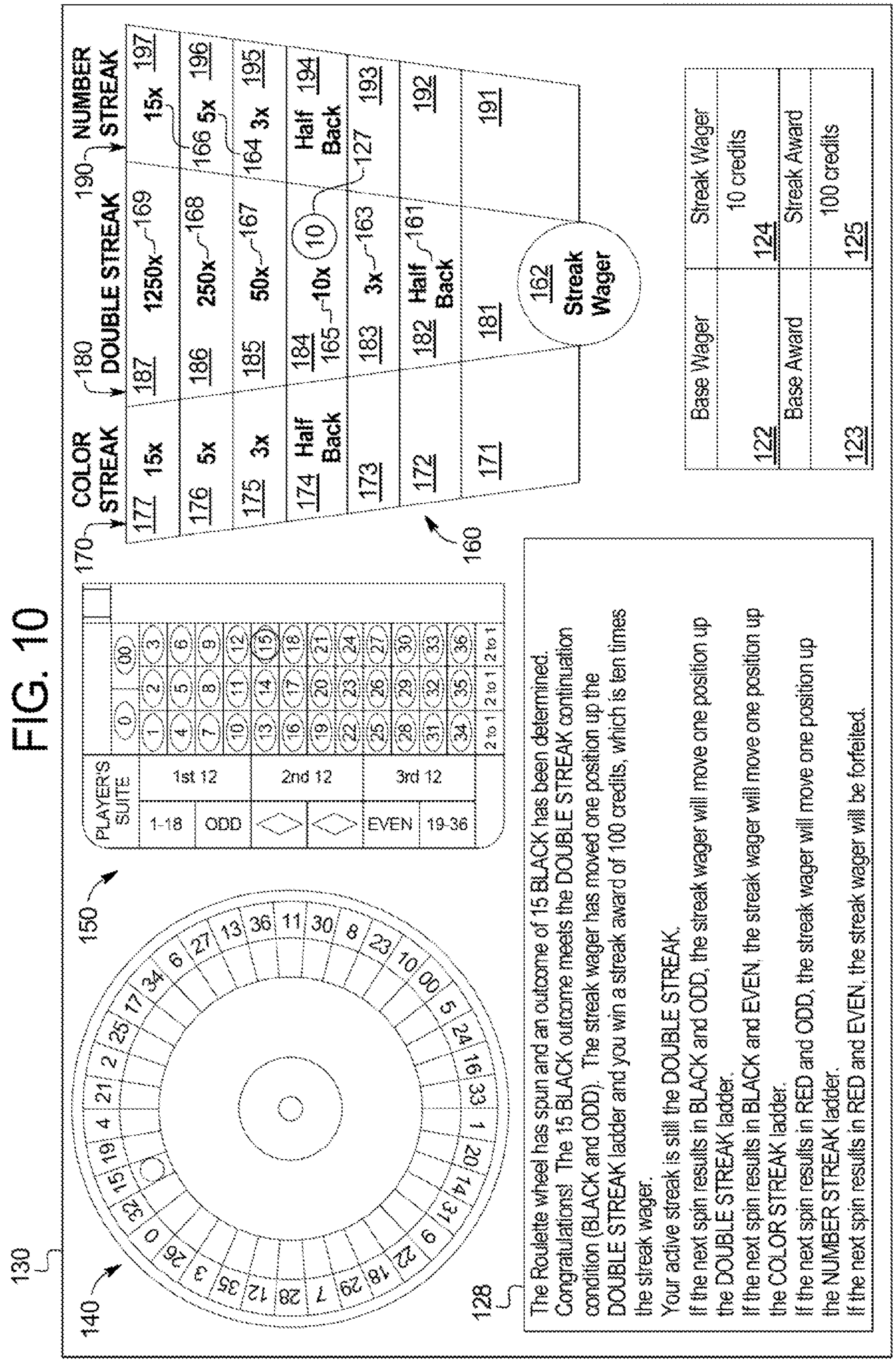
FIG. 10 is a front elevational view of a screen shot of the display device of FIG. 4 including notifications: that the outcome of the Roulette game satisfies the DOUBLE STREAK continuation condition, that the player wins a streak award, that the DOUBLE STREAK is maintained as the active streak, and of the potential outcomes following the next spin of the Roulette wheel.

As illustrated in FIG. 10, the gaming system displays a spin of the Roulette wheel 140 and randomly generates and displays the 15 BLACK outcome. Since the 15 BLACK outcome satisfies the DOUBLE STREAK continuation condition (i.e., is a BLACK and ODD outcome), and since the DOUBLE STREAK is set as the active streak, the streak wager indicator 127 moves one position up the DOUBLE STREAK ladder 180 to DOUBLE STREAK ladder position 184. Since DOUBLE STREAK ladder position 184 is associated with the 10× streak award, the player wins a streak award of 100 credits, which is ten times the streak wager of 10 credits. The streak wager display area 125 displays the streak award of 100 credits. The player is provided with 100 credits.

Since the 15 BLACK outcome satisfies the DOUBLE STREAK continuation condition, the DOUBLE STREAK is maintained as the active streak. As displayed in the indication box 128, since the DOUBLE STREAK is maintained as the active streak: (a) if the outcome of the next spin of the Roulette wheel satisfies the DOUBLE STREAK continuation condition (i.e., is a BLACK and ODD outcome), the streak wager indicator 127 moves one position up the DOUBLE STREAK ladder 180 to DOUBLE STREAK ladder position 185 and the DOUBLE STREAK is maintained as the active streak; (b) if the outcome of the next spin of the Roulette wheel does not satisfy the DOUBLE STREAK continuation condition but satisfies the COLOR STREAK continuation condition (i.e., is a BLACK and EVEN outcome), the streak wager indicator 127 moves one position up the COLOR STREAK ladder 170 to the COLOR STREAK ladder position 175 and the COLOR STREAK is set as the active streak; (c) if the outcome of the next spin of the Roulette wheel does not satisfy the DOUBLE STREAK continuation condition but satisfies the NUMBER STREAK continuation condition (i.e., is a RED and ODD outcome), the streak wager indicator 127 moves one position up the NUMBER STREAK ladder 190 to the NUMBER STREAK ladder position 195 and the NUMBER STREAK is set as the active streak; and (d) if the outcome of the next spin of the Roulette wheel satisfies neither the DOUBLE STREAK nor the COLOR STREAK nor the NUMBER STREAK continuation condition (i.e., is a RED and EVEN outcome), the streak wager is forfeited and the multiple streak game ends.

Figure 11:
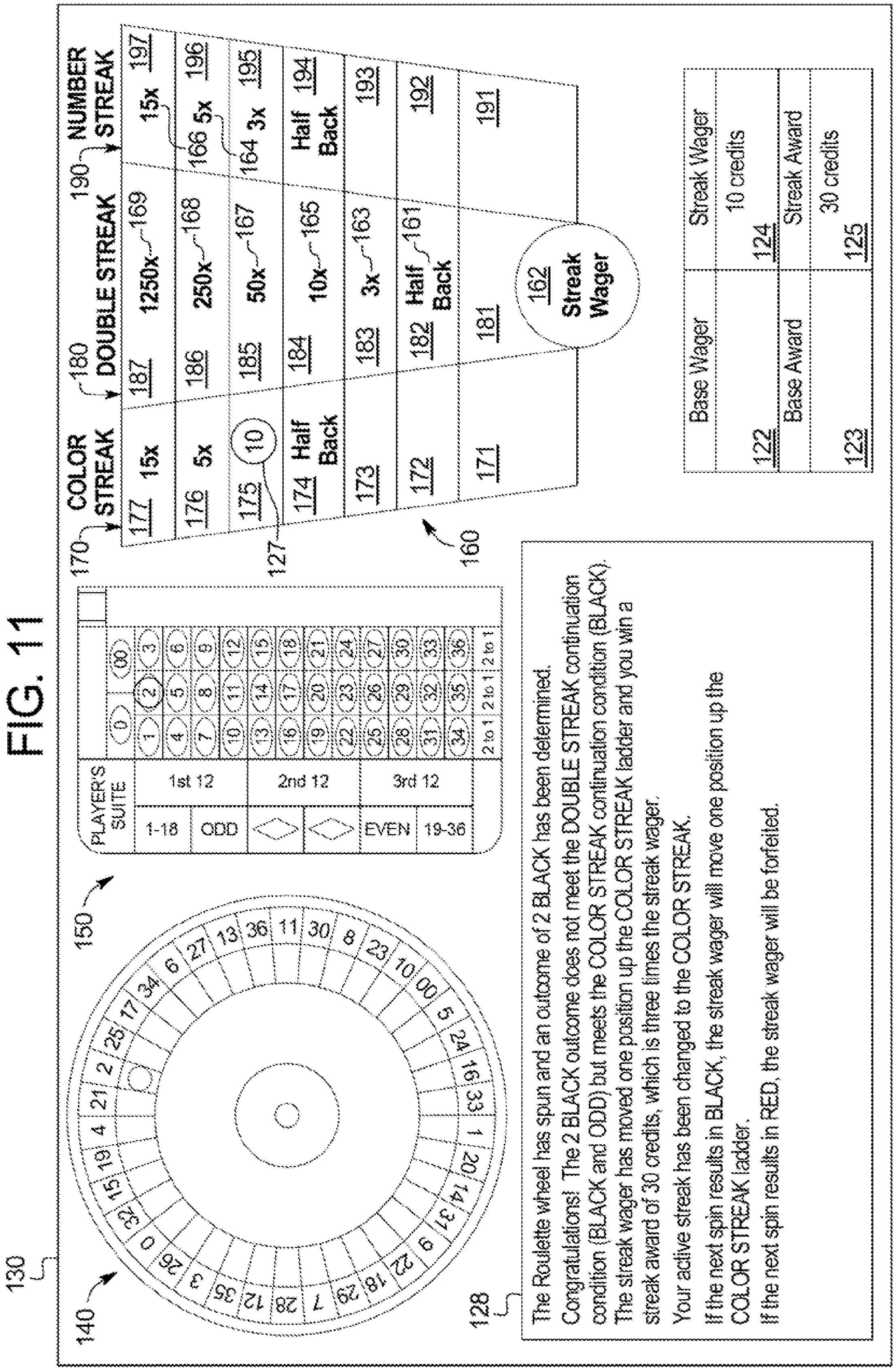
FIG. 11 is a front elevational view of a screen shot of the display device of FIG. 4 including notifications: that the outcome of the Roulette game does not satisfy the DOUBLE STREAK continuation condition but satisfies the COLOR STREAK continuation condition, that the player wins a streak award, that the COLOR STREAK is set as the active streak, and of the potential outcomes following the next spin of the Roulette wheel.

As illustrated in FIG. 11, the gaming system displays a spin of the Roulette wheel 140 and randomly generates and displays the 2 BLACK outcome. Since the 2 BLACK outcome does not satisfy the DOUBLE STREAK continuation condition but satisfies the COLOR STREAK continuation condition (i.e., is a BLACK and EVEN outcome), and since the DOUBLE STREAK is set as the active streak, the streak wager indicator 127 moves one position up the COLOR STREAK ladder 170 to COLOR STREAK ladder position 175. Since COLOR STREAK ladder position 175 is associated with the 3× streak award, the player wins a streak award of 30 credits, which is three times the streak wager of 10 credits. The streak wager display area 125 displays the streak award of 30 credits. The player is provided with 30 credits.

Since the 2 BLACK outcome satisfied the COLOR STREAK continuation condition, the COLOR STREAK is set as the active streak. As displayed in the indication box 128, since the COLOR STREAK has been set as the active streak: (a) if the outcome of the next spin of the Roulette wheel satisfies the COLOR STREAK continuation condition (i.e., is a BLACK outcome), the streak wager indicator 127 moves one position up the COLOR STREAK ladder 170 to COLOR STREAK ladder position 186 and the COLOR STREAK is maintained as the active streak; and (b) if the outcome of the next spin of the Roulette wheel does not satisfy the COLOR STREAK continuation condition (i.e., is a RED outcome), the streak wager is forfeited and the multiple streak game ends.

Figure 12:
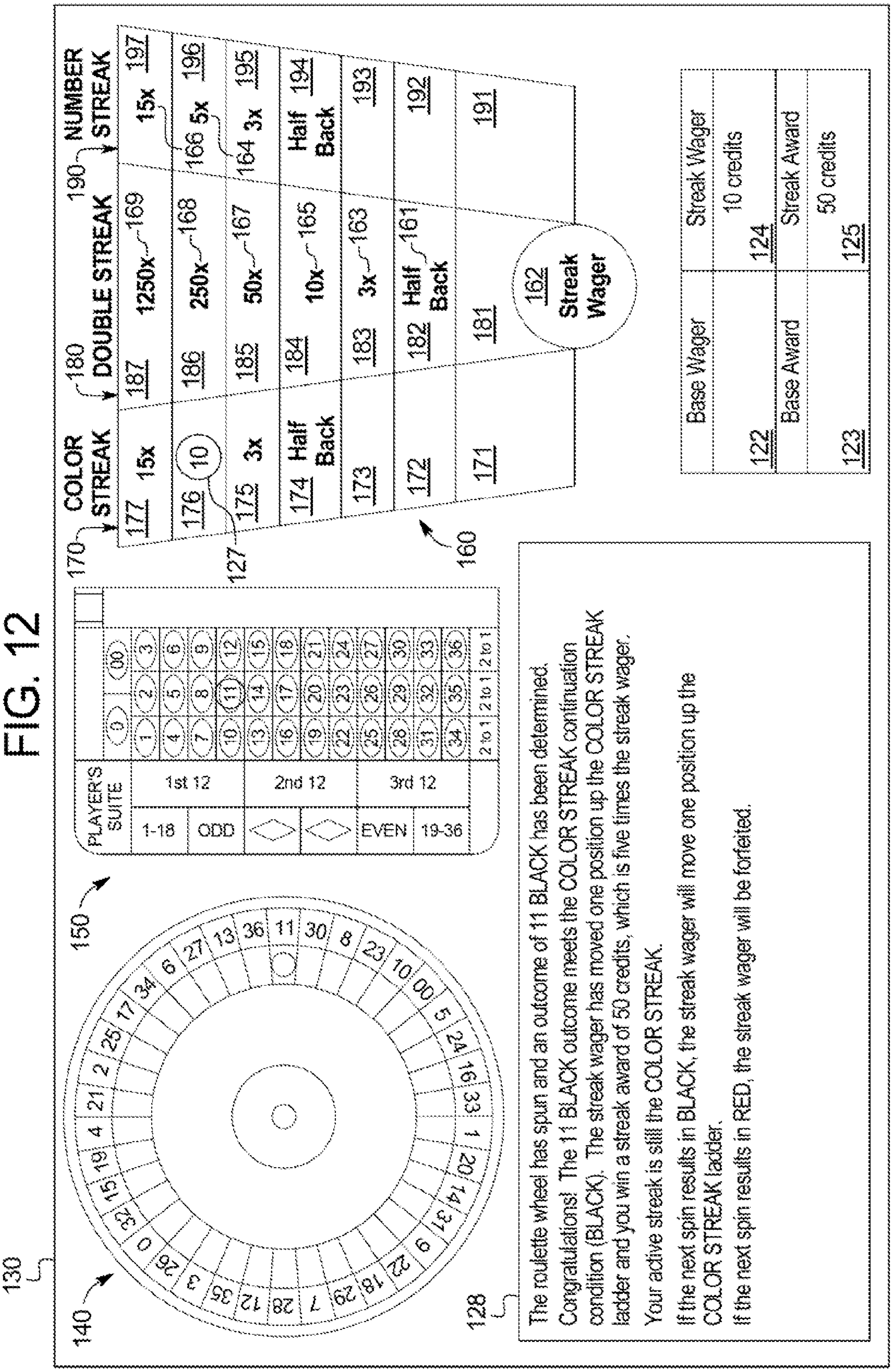
FIG. 12 is a front elevational view of a screen shot of the display device of FIG. 4 including notifications: that the outcome of the Roulette game satisfies the COLOR STREAK continuation condition, that the player wins a streak award, that the COLOR STREAK is maintained as the active streak, and of the potential outcomes following the next spin of the Roulette wheel.

As illustrated in FIG. 12, the gaming system displays a spin of the Roulette wheel 140 and randomly generates and displays the 11 BLACK outcome. Since the 11 BLACK outcome satisfies the COLOR STREAK continuation condition (i.e., is a BLACK outcome), and since the COLOR STREAK is set as the active streak, the streak wager indicator 127 moves one position up the COLOR STREAK ladder 170 to COLOR STREAK ladder position 176. Since COLOR STREAK ladder position 176 is associated with the 10× streak award, the player wins a streak award of 100 credits, which is ten times the streak wager of 10 credits. The streak wager display area 125 displays the streak award of 100 credits. The player is provided with 100 credits.

Since the 11 BLACK outcome satisfies the COLOR STREAK continuation condition, the COLOR STREAK is maintained as the active streak. As displayed in the indication box 128, since the COLOR STREAK is maintained as the active streak: (a) if the outcome of the next spin of the Roulette wheel satisfies the COLOR STREAK continuation condition (i.e., is a BLACK outcome), the streak wager indicator 127 moves one position up the COLOR STREAK ladder 170 to COLOR STREAK ladder position 187 and the COLOR STREAK is maintained as the active streak; and (b) if the outcome of the next spin of the Roulette wheel does not satisfy the COLOR STREAK continuation condition (i.e., is a RED outcome), the streak wager is forfeited and the multiple streak game ends.

Figure 13:
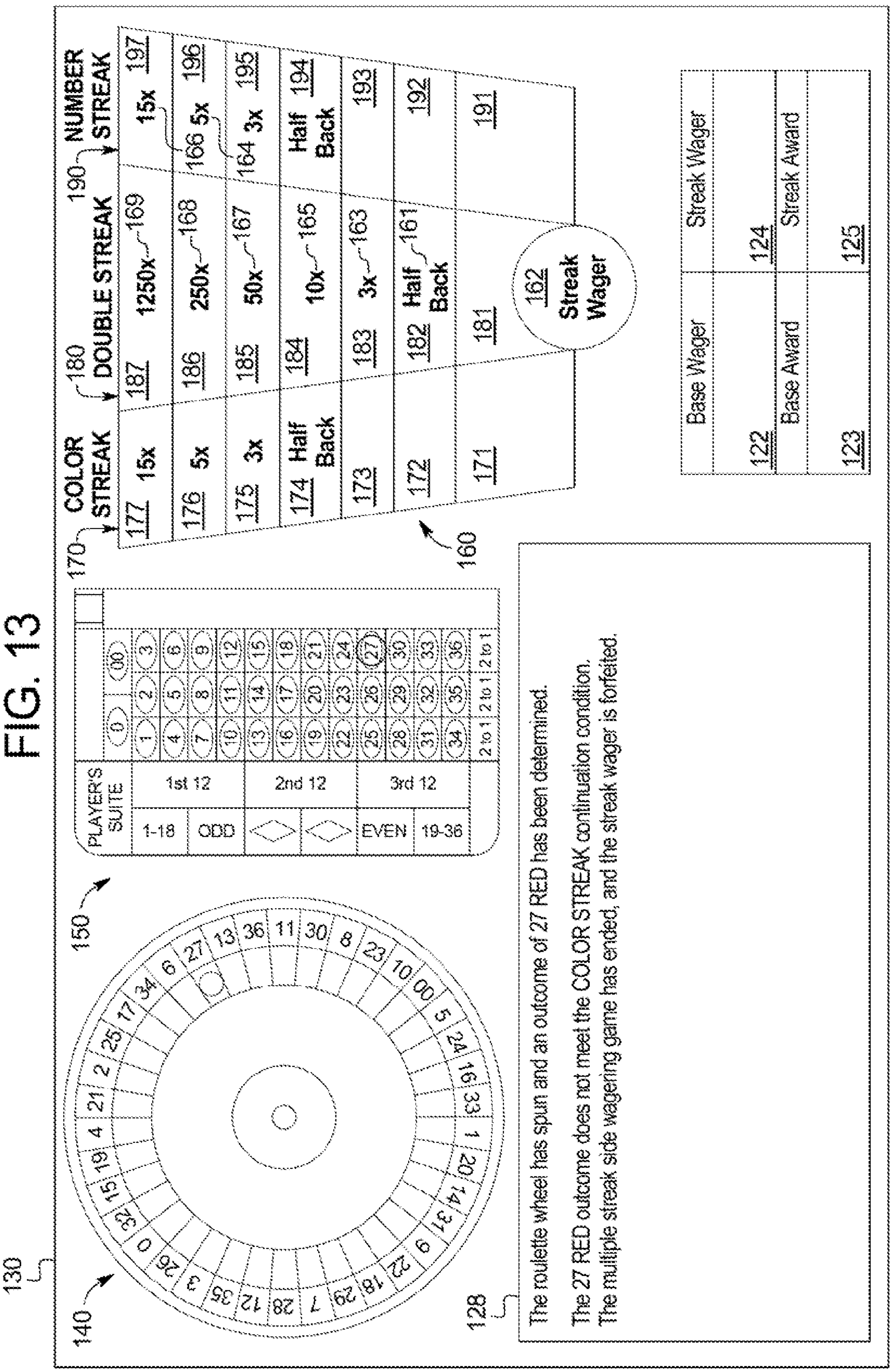
FIG. 13 is a front elevational view of a screen shot of the display device of FIG. 4 including notifications: that the outcome of the Roulette game does not satisfy the COLOR STREAK continuation condition and that the multiple streak game has ended.

As illustrated in FIG. 13, the gaming system displays a spin of the Roulette wheel 140 and randomly generates and displays the 27 RED outcome. Since the 27 RED outcome does not satisfy the COLOR STREAK continuation condition (i.e., is a RED outcome), and since the COLOR STREAK is set as the active streak, the streak wager is forfeited and the multiple streak game ends.

While the DOUBLE STREAK, COLOR STREAK, and NUMBER STREAK ladders the embodiment described above with respect to FIGS. 4, 5, 6, 7, 8, 9, 10, 11, 12, and 13 each include the same quantity of streak ladder positions (seven), it should be appreciated that in other embodiments the streak ladders each include different quantities of ladder positions. For example, in one of these embodiments the one streak ladder includes seven streak ladder positions and another streak ladder includes six streak ladder positions. In another embodiment, at least one of a plurality of streak ladders includes a different quantity of streak ladder positions than the other ladders. For example, in one of these embodiments one streak ladder includes seven streak ladder positions and the two other streak ladders each include five streak ladder positions.

While the embodiment of the gaming system described above with respect to FIGS. 4, 5, 6, 7, 8, 9, 10, 11, 12, and 13 includes awards that generally increase moving up each of the streak ladders, it should be appreciated that, in other embodiments, awards may remain the same or even decrease moving up the streak ladders. In another embodiment, the streak ladder positions of different ladders are associated with different types of awards. For example, in one of these embodiments embodiment, the streak ladder positions of one streak ladder are associated with comp awards, the streak ladder positions of another streak ladder are associated with non-credit awards, and the streak ladder positions of another streak ladder are associated with credit awards. In another embodiment, the streak ladder positions of at least one of the streak ladders are associated with different awards than the streak ladder positions of the other streak ladders.

In other embodiments, at least one of the streaks is randomly determined by the gaming system. In one of these embodiments in which the base or primary wagering game is Roulette, the gaming system may randomly choose the streaks from a plurality of streaks such as, but not limited to, COLOR STREAK, NUMBER STREAK, HIGH STREAK, LOW STREAK, NUMBER RANGE STREAK, FIRST THIRD STREAK, SECOND THIRD STREAK, THIRD THIRD STREAK, DOUBLE STREAK, TRIPLE STREAK, and QUADRUPLE STREAK. In another embodiment, at least one of the streaks is selected by the player. In another embodiment, the gaming device selects at least one of the streaks based on the base or streak wager made by the player.

The HIGH STREAK is associated with whether the outcome of the Roulette game is HIGH (i.e., numbers 19 through 36, inclusive). The HIGH STREAK has a HIGH STREAK continuation condition that is satisfied when an outcome of the Roulette game is one of the numbers 19 through 36, inclusive. The LOW STREAK is associated with whether the outcome of the Roulette game is LOW (i.e., numbers 1 through 18, inclusive). The LOW STREAK has a LOW STREAK continuation condition that is satisfied when an outcome of the Roulette game is one of the numbers 1 through 18, inclusive. The NUMBER RANGE STREAK is associated with whether the outcome of the Roulette game falls within a specified range of numbers. The NUMBER RANGE STREAK has a NUMBER RANGE STREAK continuation condition that is satisfied when an outcome of the Roulette game is one of the numbers included in the specified range. For example, in one embodiment the NUMBER RANGE STREAK continuation condition is satisfied when the outcome of the Roulette game is one of the numbers 1 through 4, inclusive. The range associated with the NUMBER RANGE STREAK may be determined in any suitable manner, such as randomly by the gaming system or by player selection. The FIRST THIRD STREAK is associated with whether the outcome of the Roulette game is one of the numbers 1 through 12, inclusive. The FIRST THIRD STREAK has a FIRST THIRD STREAK continuation condition that is satisfied when the outcome of the Roulette game is one of the numbers 1 through 12, inclusive. The SECOND THIRD STREAK and the THIRD THIRD STREAK are similar to the FIRST THIRD STREAK, but are associated with the numbers 13 through 24, inclusive, and 25 through 36, inclusive, respectively. The DOUBLE STREAK includes any two of the streaks described above, the TRIPLE STREAK includes any three of the streaks described above, and the QUADRUPLE STREAK includes any four of the streaks described above.

In another embodiment, when the player places the streak wager the gaming system randomly selects which of at least one of the streaks to set as the active streak associated with the streak wager. In another embodiment, when the player places the streak wager the player selects which of at least one of the streaks to set as the active streak associated with the streak wager. In another embodiment, when the player places the streak wager the gaming system selects which of at least one of the streaks to set as the active streak associated with the streak wager based on the streak wager and/or the base wager.

In certain other embodiments, once the streaks are determined, at least one of the streak continuation conditions is set by the gaming system prior to the first play of the base or primary wagering game. In one of these embodiments in which the base or primary wagering game is Roulette, if a first streak is a COLOR STREAK, the gaming system sets the COLOR STREAK continuation condition as either RED or BLACK prior to the first play of the Roulette game associated with the multiple streak game. The gaming system may do so randomly, based on the base wager or streak wager made by the player, or in any other suitable manner. In another embodiment, at least one of the streak continuation conditions is set by the player. In another embodiment, at least one of the streak continuation conditions is set by the gaming system based on an outcome of a play of the base or primary wagering game other than the first play of the base or primary wagering game following the player's placement of the streak wager.

In another embodiment, at least one of the streak continuation conditions may change during play of the multiple streak game. In one example embodiment, the gaming system enables the player to pay a fee or place an additional wager to change or modify at least one of the streak continuation conditions. In another example embodiment, the gaming system randomly determines whether the outcome of a play of the base or primary wagering game will alter at least one of the streak continuation conditions.

In another embodiment, once a streak other than the multiple streak begins, the streak continues to advance as long as any of the conditions of the first quantity of conditions (i.e., the conditions included in the multiple streak continuation condition) are satisfied.

In another embodiment, the gaming system does not provide the player with the streak award each time the player wins one of the streak awards (i.e., does not provide the player with the streak award prior to the next play of the base or primary wagering game associated with the multiple streak game). Rather, in this embodiment the gaming system accumulates each of the streak awards into a total streak award and provides the player with the total streak award when the multiple streak game ends.

In certain embodiments, the outcomes used to determine whether the continuation conditions have been satisfied are generated using two or more devices, such as two or more Roulette wheels. In one of these embodiments, the plurality of outcome generators are each included in a single synchronized system, such as a gaming system with multiple concentric rotors. In another one of these embodiments, the two or more devices are associated with the same base or primary wagering game. In another one of these embodiments, the two or more devices are associated with different base or primary wagering games.

Figure 14B:
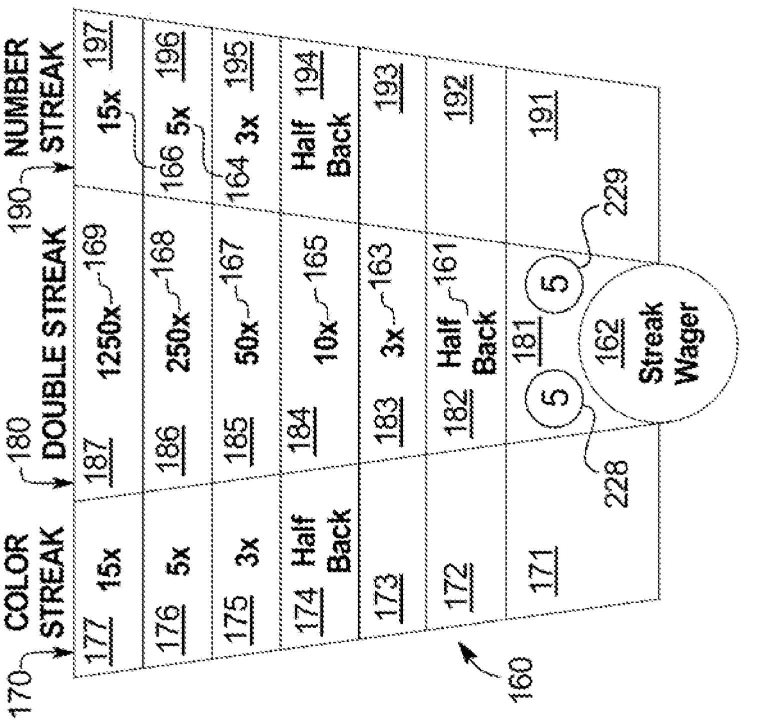
Figure 14A:
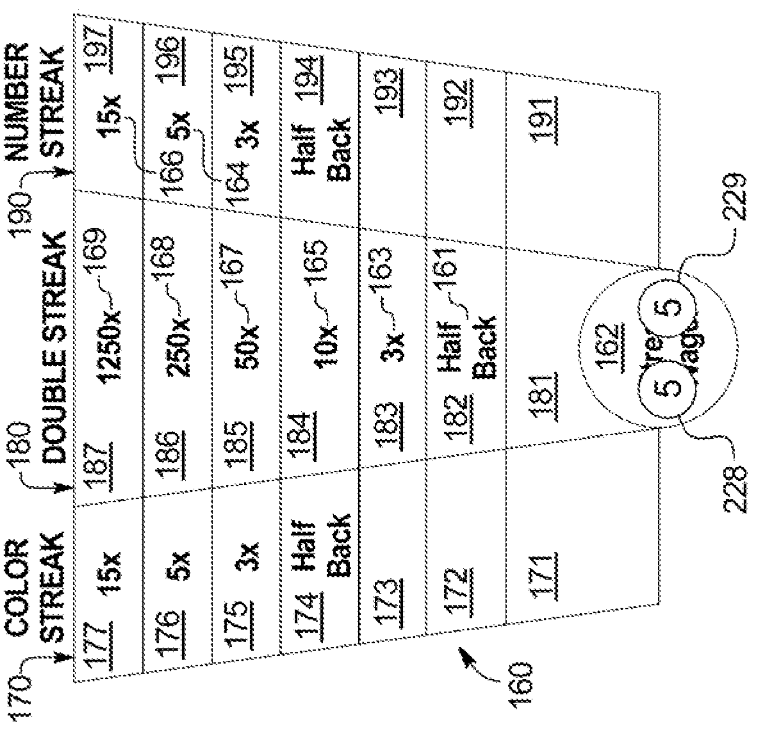
Figure 14D:
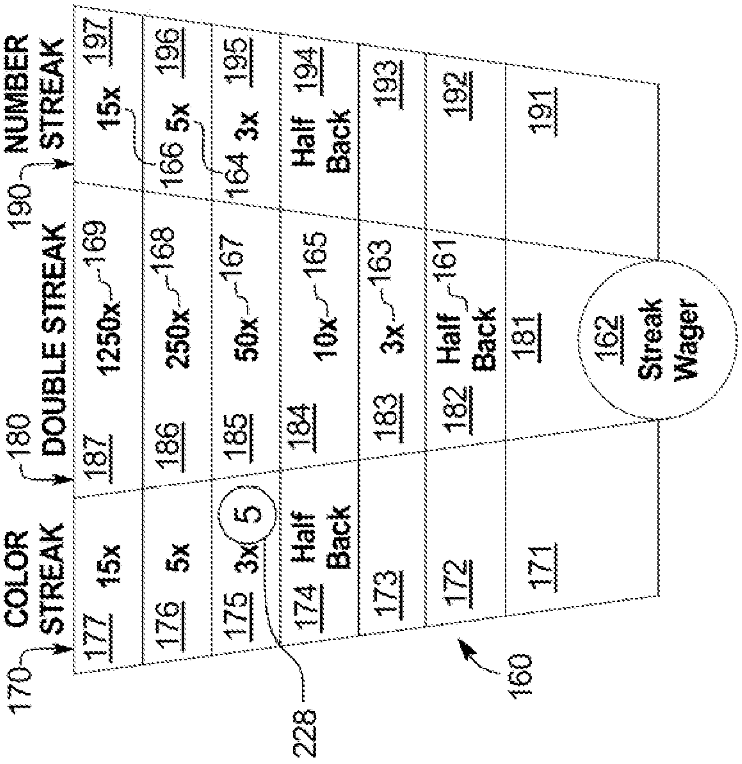
Figure 14C:
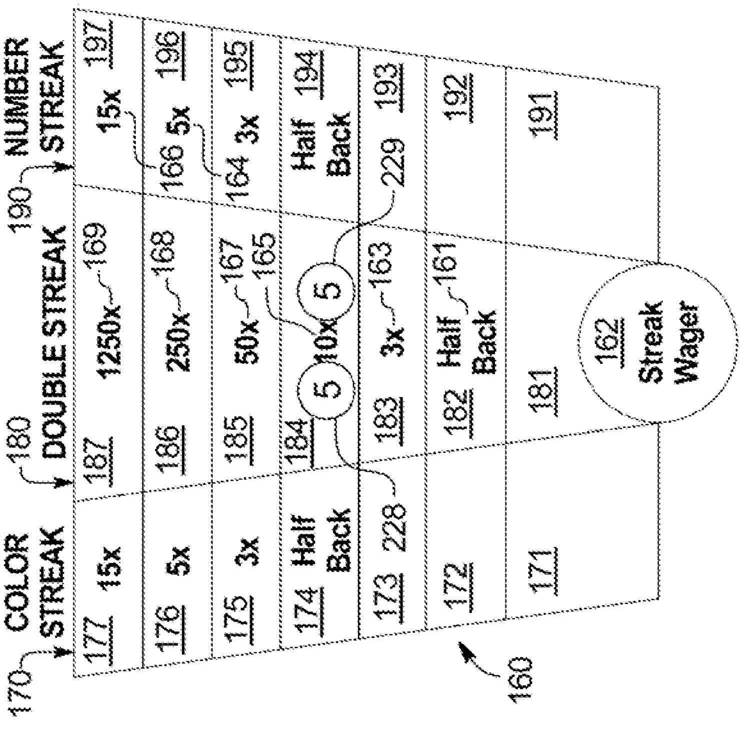

In other embodiments, the gaming system causes the player to forfeit a portion of the streak wager when the active streak is changed from one of the streaks to another one of the streaks. FIGS. 14A, 14B, 14C, and 14D illustrate an example of one of these embodiments in which the multiple streak game is associated with a Roulette game. In this example embodiment, as shown in FIG. 14A, the player places a streak wager of 10 credits, which is displayed as a first streak wager portion 228 of 5 credits (i.e., one-half of the streak wager of 10 credits) and a second streak wager portion 229 of 5 credits (i.e., one-half of the streak wager of 10 credits). The Roulette wheel spins; the outcome satisfies the DOUBLE STREAK continuation condition; and, as shown in FIG. 14B, the first streak wager portion 228 and the second streak wager portion 229 move one position up the DOUBLE STREAK ladder 180 to DOUBLE STREAK ladder position 181. As illustrated in FIG. 14C, after a fourth consecutive spin of the Roulette wheel results in an outcome that satisfies the DOUBLE STREAK continuation condition, the first and second streak wager portions 228 and 229 move to DOUBLE STREAK ladder position 184 and the player is provided with a streak award of 100 credits (10× the streak wager of 10 credits). The next spin of the roulette wheel does not satisfy the DOUBLE STREAK continuation condition but satisfies the COLOR STREAK continuation condition. This causes the active streak to change from the DOUBLE STREAK (i.e., the multiple streak) to the COLOR STREAK (i.e., the first streak). Therefore, as illustrated in FIG. 14C, the second streak wager portion 229 is forfeited and the first streak wager portion 228 moves one position up the COLOR STREAK ladder to COLOR STREAK ladder position 175. Accordingly, the player is provided with a streak award of 15 credits (3× the first streak wager portion of 5 credits).

It should be appreciated that in other of these embodiments the gaming system does not display the streak wager as multiple streak wager portions; rather, the gaming system displays the streak wager as a single value and indicates that the value changes when the active streak changes from the multiple streak to the first or second streak. It should also be appreciated that the gaming system may cause the player to forfeit any suitable portion of the streak wager when the active streak is changed from the multiple streak to the first or second streak.

In one embodiment, when the streak indicator reaches the top of any one of the streak ladders (i.e., the final streak ladder position), the streak wager is returned to the player. In the example embodiment described above with respect to FIGS. 4, 5, 6, 7, 8, 9, 10, 11, 12, and 13, if the streak wager indicator 127 reaches the COLOR STREAK ladder position 177, the NUMBER STREAK ladder position 197, or the DOUBLE STREAK ladder position 187, the streak wager of 10 credits is returned to the player.

In another embodiment, the multiple streak game includes at least one maintain streak continuation condition. In this embodiment, when the maintain streak continuation condition is satisfied, any active streaks are unaffected. Put differently, any active streaks do not change when the maintain streak continuation condition is satisfied. No matter the outcome of the base or primary game, the streak wager indicators do not move up a streak ladder, the player does not receive any awards, and the multiple streak game does not end. In an embodiment in which the base or primary wagering game is Roulette, the main streak continuation condition is satisfied when the outcome of the Roulette game is the GREEN 0 or the GREEN 00 outcome. In an embodiment in which the base or primary wagering game is Sic Bo, the maintain streak continuation condition is satisfied when the outcome of the Sic Bo game is matching three of a kind. In an embodiment in which the base or primary wagering game is Craps, the maintain streak continuation condition is satisfied when the outcome of the Craps game is a two dice sum of seven.

In another embodiment in which the multiple streak game is associated with a base or primary wagering game of Roulette, if the outcome of a play of the Roulette game is the GREEN 0 or the GREEN 00 outcome, the gaming system: (a) ends the multiple streak game, (b) holds the streak indicator in place (i.e., acts as if no outcome has occurred), or (c) advances the streak indicator up the streak ladder on which it is located and provides any associated streak award.

In other embodiments, the multiple streak game includes an anti-terminator configured to nullify an outcome that does not satisfy at least one of the streak continuation conditions of any active streaks. For example, if the outcome of one of the plays of the base or primary game associated with the multiple streak game does not satisfy any of the streak continuation conditions and the player has and chooses to use an anti-terminator, any active streaks are unaffected. Instead of ending the multiple streak game, the player's streaks remain active and the player may continue playing the multiple streak game.

In one of these embodiments, the player may accumulate anti-terminators for later use to suspend a future termination condition. In one example embodiment of the multiple streak game in which the base or primary wagering game is Roulette, the player is provided with an anti-terminator for each GREEN 0 or GREEN 00 outcome the player obtains. The player may accumulate these anti-terminators and use them to nullify future outcomes of the Roulette game that do not satisfy any of the streak continuation conditions of any active streaks. In one embodiment, the player may be limited to holding at limited number of anti-terminators at a time. In one embodiment, an anti-terminator may only be applied to certain types of terminations. For example, each streak of the multiple streak game may be associated with its own exclusive anti-terminators. In one embodiment, a player may forfeit all of the player's anti-terminations if a certain condition is satisfied. In one embodiment, the player's anti-terminator may be automatically redeemed when the multiple streak game or one of the active streaks would otherwise terminate. In another embodiment, the player decides if and when to redeem his or her anti-terminator. For example, a player may prefer not to use the player's anti-terminator to continue a streak that is about to terminate, and the player might do so in expectation of being able to use the anti-terminator in the future to salvage a more valuable streak. In one embodiment, the player may earn an anti-terminator for achieving a certain threshold in the streak. In another embodiment, the player is provided with a designated number of anti-terminators, such as one or any other suitable number, upon the initiation of the multiple streak game.

Figure 15B:
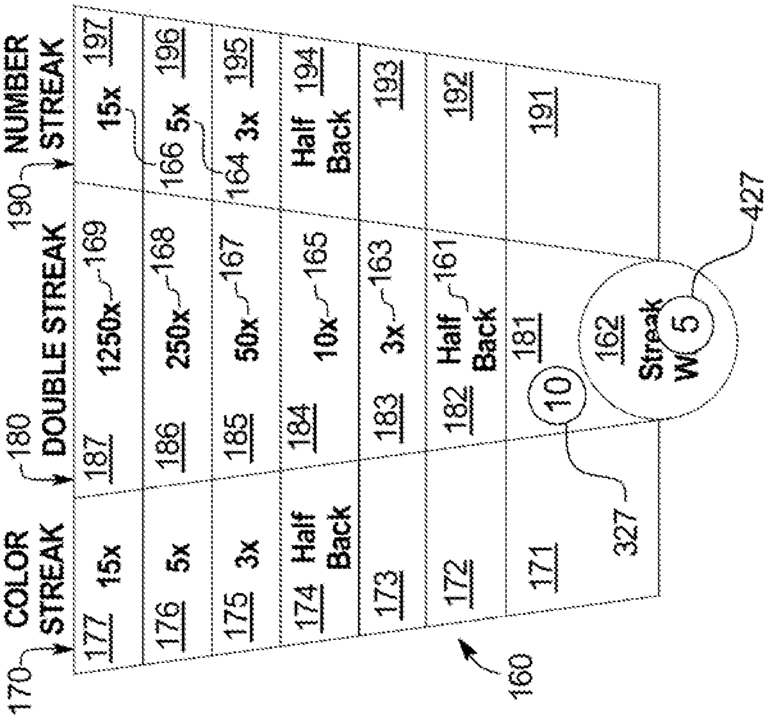
FIGS. 15A, 15B, 15C, and 15D are front elevational views of the multiple streak game area of an embodiment of the multiple streak game of the present disclosure that enables a player to place multiple streak wagers.
Figure 15A:
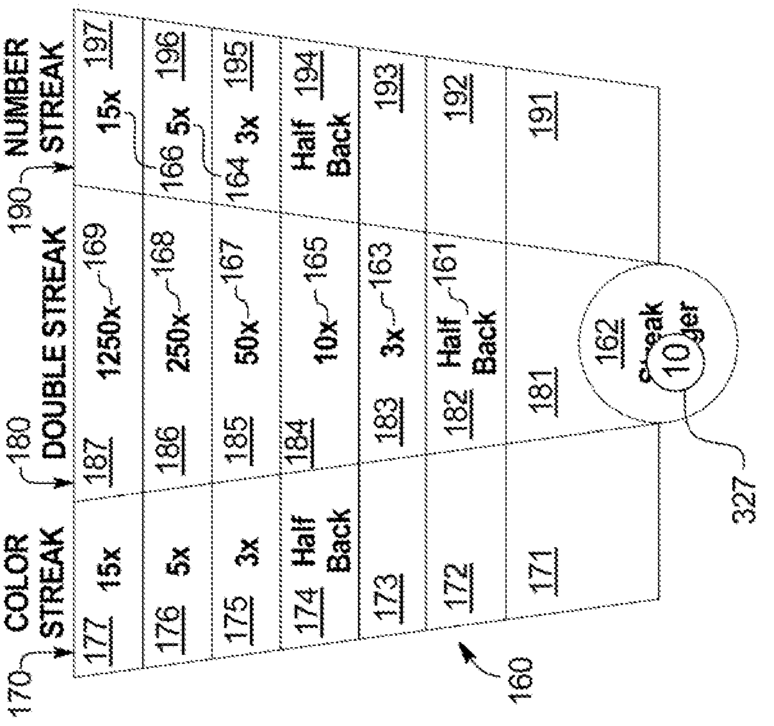
Figure 15D:
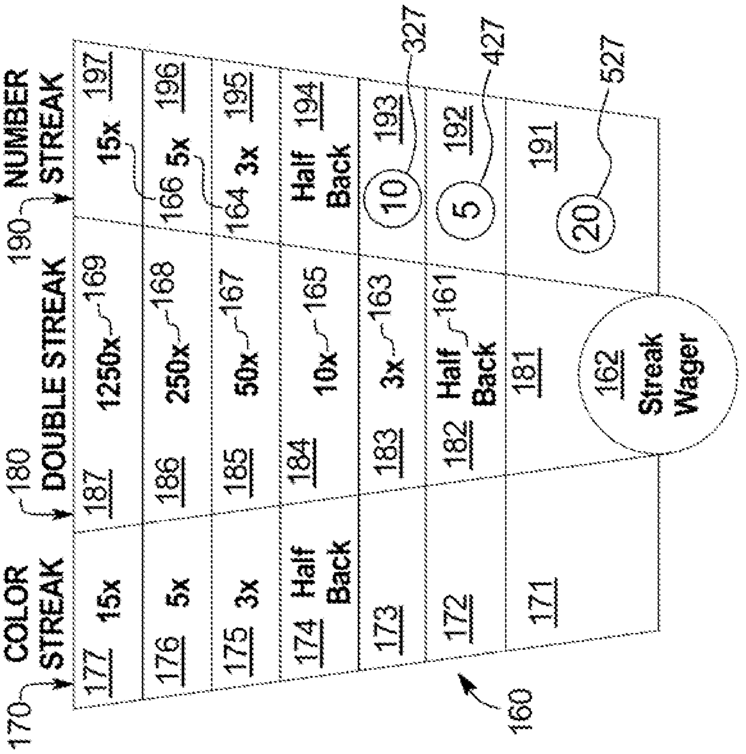
Figure 15C:
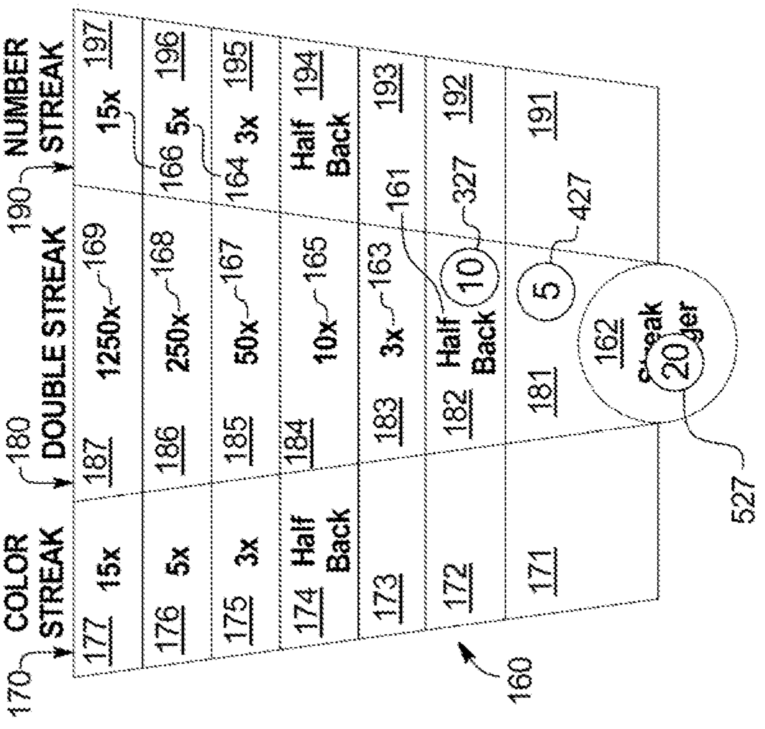

In one embodiment, the gaming system enables the player to place a new streak wager prior to each play of the base or primary wagering game associated with the multiple streak game. Thus, the player may have multiple active streak wagers at one time. The multiple streak game operates in generally the same manner described above with respect to each of the new streak wagers. FIGS. 15A, 15B, 15C, and 15D illustrate an example of this embodiment in which the multiple streak game is associated with Roulette. The player places a first streak wager 327 of 10 credits, as shown in FIG. 15A. As described above with respect to FIGS. 4, 5, 6, 7, 8, 9, 10, 11, 12, and 13, the outcome of the first play of the Roulette game following the placement of the streak wager sets the COLOR STREAK, NUMBER STREAK, and DOUBLE STREAK continuation conditions. As illustrated in FIG. 158, the outcome of the second spin of the Roulette game satisfied the DOUBLE STREAK continuation condition, and the first streak wager 327 moves one position up the DOUBLE STREAK ladder 180 to the DOUBLE STREAK ladder position 181. Prior to the next spin of the Roulette wheel, the player places a second streak wager 427 of 5 credits. In this embodiment, the streaks and the streak continuation conditions are the same for each active streak wager. Therefore, when the outcome of the third spin of the Roulette wheel satisfies the DOUBLE STREAK continuation condition, the first streak wager 327 moves up one position to DOUBLE STREAK ladder position 182 and the second streak wager 427 moves up one position to the DOUBLE STREAK ladder position 181, as shown in FIG. 15C. Accordingly, the player is provided with a streak award of 5 credits (one-half of the first streak wager of 10 credits). Prior to the next spin of the Roulette wheel, the player places a third streak wager 527 of 20 credits, as illustrated in FIG. 15C. The outcome of the fourth spin of the Roulette wheel does not satisfy the DOUBLE STREAK continuation condition but satisfies the NUMBER STREAK continuation condition. Therefore, as illustrated in FIG. 15D, the first streak wager 327 moves up one position to NUMBER STREAK ladder position 193, the second streak wager 427 moves up one position to NUMBER STREAK ladder position 192, and the third streak wager 527 moves up one position to NUMBER STREAK ladder position 191.

It should be appreciated that, while each separate streak wager of the gaming system of the example embodiment described above with respect to FIGS. 15A, 15B, 15C, and 15D is associated with the same streaks and streak continuation conditions, in other embodiments each streak wager is associated with its own streaks and/or continuation conditions, which may differ among the streak wagers. In certain of these embodiments, each streak wager is associated with its own multiple streak game area.

In one embodiment, the multiple streak game includes a third streak having a third streak continuation condition that is satisfied when an outcome of a base or primary wagering game satisfies a single condition rather than a multiple streak having a multiple streak continuation condition that is satisfied when an outcome of the base or primary wagering game satisfies a plurality of conditions. In this embodiment, the multiple streak game operates in generally the same manner described above. In one such embodiment each of the streak continuation conditions are independent of one another.

In another embodiment of the multiple streak game described above with respect to FIGS. 4, 5, 6, 7, 8, 9, 10, 11, 12, and 13, the active streak may be changed from the first or second streak back to the multiple streak. For example, if the active streak is the first or second streak, the active streak changes from the first or second streak back to the multiple streak when an outcome of a play of the Roulette game satisfies the DOUBLE STREAK continuation condition (i.e., the multiple streak continuation condition).

While the embodiments described above were described in association with an electronic version of the multiple streak game associated with Roulette, it should be appreciated that the multiple streak game may be employed with a physical Roulette table. One example of this embodiment is illustrated in FIGS. 16 and 17. A roulette game table 600 includes a support structure 614 supporting a roulette wheel assembly 640 and a game table surface 610. The game table surface 610 includes a Roulette betting layout 650 and a multiple streak game area 660. One or more players 605 may participate in the Roulette game and the associated multiple streak game. The operation of the multiple streak game in association with this physical Roulette table is substantially the same as it is in association with the electronic embodiments described above.

It should be appreciated that the multiple streak game may be modified and employed in association with base or primary wagering games other than Roulette, such as, but not limited to, bingo; dice games such as Craps or Sic Bo; or card games such as Baccarat or Blackjack. In certain embodiments having a base or primary wagering game that is a dice game, one streak is based on EVEN/ODD totals and another streak is based on HIGH/LOW totals. In one of these embodiments having a base or primary wagering game of Craps, a HIGH STREAK has a HIGH STREAK continuation condition that is satisfied when an outcome of the Craps game includes any two-dice sum (a) greater than seven, or (b) equal to seven where the first die to resolve is higher than the second die to resolve. In this embodiment, the LOW STREAK has a LOW STREAK continuation condition that is satisfied when the outcome of the Craps game is any remaining outcome. In one of these embodiments having a base or primary wagering game of Sic Bo, a HIGH STREAK has a HIGH STREAK continuation condition that is satisfied when an outcome of the Sic Bo game includes any three-dice sum greater than or equal to 10. In this embodiment, the LOW STREAK has a LOW STREAK continuation condition that is satisfied when an outcome of the Sic Bo game is any three dice sum greater than or equal to 11.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

at least one display device;

at least one input device;

at least one processor; and at least one memory device that stores a plurality of instructions which, when executed by the at least one processor, cause the at least one processor to operate with the at least one display device and the at least one input device to:

(a) for a first play of a roulette game, each play of the roulette game resulting in one of a plurality of different outcomes:

(i) receive, from a player, at least one base wager on said first play of the roulette game and a supplemental wager on a streak game, the streak game including a primary streak, a first secondary streak, and a second secondary streak, the primary, first secondary, and second secondary streaks being different;

(ii) determine an outcome of said first play of the roulette game, said outcome being one of the different outcomes;

(iii) determine whether to provide any base awards to the player based on said outcome and provide any determined base awards to the player, (iv) determine a primary streak condition, a first secondary streak condition, and a second secondary streak condition based on said outcome, the primary, first secondary, and second secondary streak conditions being different; and (v) set the primary streak as a current streak and the primary streak condition as a current streak condition; and (b) following the first play of the roulette game:

(i) determine an outcome of a play of the roulette game, said outcome being one of the different outcomes;

(ii) if said outcome meets the current streak condition:

(A) determine and display a supplemental award, and (B) continue the current streak by repeating (b)(i) to (b)(iii); and (iii) if said outcome does not meet the current streak condition:

(A) if the current streak is the primary streak;

(1) if said outcome meets the first secondary streak condition and not the second secondary streak condition, change the current streak to the first secondary streak, change the current streak condition to the first secondary streak condition, and return to (b)(ii)(A);

(2) if said outcome meets the second secondary streak condition and not the first secondary streak condition, change the current streak to the second secondary streak, change the current streak condition to the second secondary streak condition, and return to (b)(ii)(A); and (3) if said outcome does not meet the first secondary streak condition or the second secondary streak condition, end the current streak;

(B) if the current streak is the first secondary streak, end the current streak; and (C) if the current streak is the second secondary streak, end the current streak.

2. The gaming system of claim 1, wherein the plurality of instructions, when executed by the at least one processor, cause the at least one processor to, if said outcome meets the current streak condition, provide the player with the determined supplemental award before providing a subsequent play of the roulette game.

3. The gaming system of claim 1, wherein the plurality of instructions, when executed by the at least one processor, cause the at least one processor to operate with the at least one input device to, for each play of the roulette game following the first play of the roulette game, enable the player to place an additional supplemental wager associated with said play of the roulette game.

4. The gaming system of claim 3, wherein the supplemental wager and any additional supplemental wagers are each associated with the determined primary streak condition, the determined first secondary streak condition, and the determined second secondary streak condition.

5. A method of operating a gaming system, said method comprising:

(a) for a first play of a roulette game, each play of the roulette game resulting in one of a plurality of different outcomes:

(i) causing at least one processor to execute a plurality of instructions to operate with at least one input device to receive, from a player, at least one base wager on said first play of the roulette game and a supplemental wager on a streak game, the streak game including a primary streak, a first secondary streak, and a second secondary streak, the primary, first secondary, and second secondary streaks being different;

(ii) causing the at least one processor to execute the plurality of instructions to determine an outcome of said first play of the roulette game, said outcome being one of the different outcomes;

(iii) causing the at least one processor to execute the plurality of instructions to determine whether to provide any base awards to the player based on said outcome and providing any determined base awards to the player;

(iv) causing the at least one processor to execute the plurality of instructions to determine a primary streak condition, a first secondary streak condition, and a second secondary streak condition based on said outcome, the primary, first secondary, and second secondary streak conditions being different; and (v) causing the at least one processor to execute the plurality of instructions to set the primary streak as a current streak and the primary streak condition as a current streak condition; and (b) following the first play of the roulette game:

(i) causing the at least one processor to execute the plurality of instructions to determine an outcome of a play of the roulette game, said outcome being one of the different outcomes;

(ii) if said outcome meets the current streak condition:

(A) causing the at least one processor to execute the plurality of instructions to determine and operate with at least one display device to display a supplemental award, and (B) continuing the current streak by repeating (b)(i) to (b)(iii); and (iii) if said outcome does not meet the current streak condition:

(A) if the current streak is the primary streak:

(1) if said outcome meets the first secondary streak condition and not the second secondary streak condition, causing the at least one processor to execute the plurality of instructions to change the current streak to the first secondary streak, change the current streak condition to the first secondary streak condition, and return to (b)(ii)(A);

(2) if said outcome meets the second secondary streak condition and not the first secondary streak condition, causing the at least one processor to execute the plurality of instructions to change the current streak to the second secondary streak, change the current streak condition to the second secondary streak condition, and return to (b)(ii)(A); and (3) if said outcome does not meet the first secondary streak condition or the second secondary streak condition, causing the at least one processor to execute the plurality of instructions to end the current streak;

(B) if the current streak is the first secondary streak, causing the at least one processor to execute the plurality of instructions to end the current streak; and (C) if the current streak is the second secondary streak, causing the at least one processor to execute the plurality of instructions to end the current streak.

6. The method of claim 5, which includes, if said outcome meets the current streak condition, providing the player with the determined supplemental award before providing a subsequent play of the roulette game.

7. The method of claim 5, which includes causing the at least one processor to execute the plurality of instructions to operate with the at least one input device to, for each play of the roulette game following the first play of the roulette game, enable the player to place an additional supplemental wager associated with said play of the roulette game.

8. The method of claim 7, wherein the supplemental wager and any additional supplemental wagers are each associated with the determined primary streak condition, the determined first secondary streak condition, and the determined second secondary streak condition.

9. The method of claim 5, which is provided through a data network.

10. The method of claim 9, wherein the data network is an internet.

11. A gaming system comprising:

at least one display device;

at least one input device;

at least one processor; and at least one memory device that stores a plurality of instructions which, when executed by the at least one processor, cause the at least one processor to operate with the at least one display device and the at least one input device to:

(i) for a first round of play of a plurality of consecutive rounds of play of a roulette game, each of the rounds of play of the roulette game resulting in one of a plurality of different outcomes, each of the different outcomes including a plurality of different characteristics:

(a) display a rotor including a plurality of symbols and a plurality of landings positioned adjacent to the symbols;

(b) receive a first base wager and a first supplemental wager from a player;

(c) display the first round of play of the roulette game;

(d) determine an outcome of the first round of play of the roulette game, said outcome being one of the different outcomes and including at least a first one of the characteristics and a second different one of the characteristics;

(e) determine any base award amount associated with said outcome based on said outcome and the first base wager;

(f) provide any determined base award amount; and (g) set a first target characteristic as the first one of the characteristics and a second target characteristic as the second different one of the characteristics;

(ii) for a second round of play of the plurality of consecutive rounds of play of the roulette game, the second round of play following the first round of play:

(a) display the second round of play of the roulette game;

(b) determine an outcome of the second round of play of the roulette game, said outcome being one of the different outcomes; and (c) if said outcome of the second round of play of the roulette game includes the first target characteristic and the second target characteristic, determine and display a first supplemental award amount associated with said outcome based on said outcome and the first supplemental wager; and (iii) if said outcome of the second round of play of the roulette game includes the first target characteristic and the second target characteristic, for a third round of play of the plurality of consecutive rounds of play of the roulette game, the third round of play following the second round of play:

(a) display the third round of play of the roulette game;

(b) determine an outcome of the third round of play of the roulette game, said outcome being one of the different outcomes;

(c) if said outcome of the third round of play of the roulette game includes the first target characteristic and the second target characteristic, determine a second supplemental award amount associated with said outcome based on said outcome and the first supplemental wager, (d) if said outcome of the third round of play of the roulette game includes the first target characteristic and not the second target characteristic, determine and display a third supplemental award amount associated with said outcome based on said outcome and the first supplemental wager, wherein the third supplemental award amount is less than the second supplemental award amount; and (e) if said outcome of the third round of play of the roulette game includes the second target characteristic and not the first target characteristic, determine and display a fourth supplemental award amount associated with said outcome based on said outcome and the first supplemental wager, wherein the fourth supplemental award amount is less than the second supplemental award amount.

12. The gaming system of claim 11, wherein the plurality of instructions, when executed by the at least one processor, cause the at least one processor to:

(A) if said outcome of the second round of play of the roulette game includes the first target characteristic and the second target characteristic, provide the determined first supplemental award amount before providing the third round of play;

(B) if said outcome of the third round of play of the roulette game includes the first target characteristic and the second target characteristic, provide the determined second supplemental award amount before providing any subsequent round of play;

(C) if said outcome of the third round of play of the roulette game includes the first target characteristic and not the second target characteristic, provide the determined third supplemental award amount before providing any subsequent round of play; and (D) if said outcome of the third round of play of the roulette game includes the second target characteristic and not the first target characteristic, provide the determined fourth supplemental award amount before providing any subsequent round of play.

13. The gaming system of claim 11, wherein the plurality of instructions, when executed by the at least one processor, cause the at least one processor to operate with the at least one input device to, for each round of play of the roulette game following the first round of play of the roulette game, enable the player to place an additional supplemental wager associated with said round of play of the roulette game.

14. The gaming system of claim 13, wherein the supplemental wager and any additional supplemental wagers are each associated with the first and second target characteristics.

15. A method of operating a gaming system, said method comprising:

(i) for a first round of play of a plurality of consecutive rounds of play of a roulette game, each of the rounds of play of the roulette game resulting in one of a plurality of different outcomes, each of the different outcomes including a plurality of different characteristics:

(a) causing at least one processor to execute a plurality of instructions to operate with at least one display device to display a rotor including a plurality of symbols and a plurality of landings positioned adjacent to the symbols;

(b) causing the at least one processor to execute the plurality of instructions to operate with at least one input device to receive a first base wager and a first supplemental wager from a player;

(c) causing the at least one processor to execute the plurality of instructions to operate with the at least one display device to display the first round of play of the roulette game;

(d) causing the at least one processor to execute the plurality of instructions to determine an outcome of the first round of play of the roulette game, said outcome being one of the different outcomes and including at least a first one of the characteristics and a second different one of the characteristics;

(e) causing the at least one processor to execute the plurality of instructions to determine any base award amount associated with said outcome based on said outcome and the first base wager;

(f) providing any determined base award amount; and (g) causing the at least one processor to execute the plurality of instructions to set a first target characteristic as the first one of the characteristics and a second target characteristic as the second different one of the characteristics;

(ii) for a second round of play of the plurality of consecutive rounds of play of the roulette game, the second round of play following the first round of play:

(a) causing the at least one processor to execute the plurality of instructions to operate with the at least one display device to display the second round of play of the roulette game;

(b) causing the at least one processor to execute the plurality of instructions to determine an outcome of the second round of play of the roulette game, said outcome being one of the different outcomes; and (c) if said outcome of the second round of play of the roulette game includes the first target characteristic and the second target characteristic, causing the at least one processor to execute the plurality of instructions to determine and operate with the at least one display device to display a first supplemental award amount associated with said outcome based on said outcome and the first supplemental wager, and (iii) if said outcome of the second round of play of the roulette game includes the first target characteristic and the second target characteristic, for a third round of play of the plurality of consecutive rounds of play of the roulette game, the third round of play following the second round of play:

(a) causing the at least one processor to execute the plurality of instructions to operate with the at least one display device to display the third round of play of the roulette game;

(b) causing the at least one processor to execute the plurality of instructions to determine an outcome of the third round of play of the roulette game, said outcome being one of the different outcomes;

(c) if said outcome of the third round of play of the roulette game includes the first target characteristic and the second target characteristic, causing the at least one processor to execute the plurality of instructions to determine and operate with the at least one display device to display a second supplemental award amount associated with said outcome based on said outcome and the first supplemental wager, (d) if said outcome of the third round of play of the roulette game includes the first target characteristic and not the second target characteristic, causing the at least one processor to execute the plurality of instructions to determine and operate with the at least one display device to display a third supplemental award amount associated with said outcome based on said outcome and the first supplemental wager, wherein the third supplemental award amount is less than the second supplemental award amount; and (e) if said outcome of the third round of play of the roulette game includes the second target characteristic and not the first target characteristic, causing the at least one processor to execute the plurality of instructions to determine and operate with the at least one display device to display a fourth supplemental award amount associated with said outcome based on said outcome and the first supplemental wager, wherein the fourth supplemental award amount is less than the second supplemental award amount.

16. The method of claim 15, which includes:

(A) if said outcome of the second round of play of the roulette game includes the first target characteristic and the second target characteristic, providing the determined first supplemental award amount before providing the third round of play;

(B) if said outcome of the third round of play of the roulette game includes the first target characteristic and the second target characteristic, providing the determined second supplemental award amount before providing any subsequent round of play;

(C) if said outcome of the third round of play of the roulette game includes the first target characteristic and not the second target characteristic, providing the determined third supplemental award amount before providing any subsequent round of play; and (D) if said outcome of the third round of play of the roulette game includes the second target characteristic and not the first target characteristic, providing the determined fourth supplemental award amount before providing any subsequent round of play.

17. The method of claim 15, which includes causing the at least one processor to execute the plurality of instructions to operate with the at least one input device to, for each round of play of the roulette game following the first round of play of the roulette game, enable the player to place an additional supplemental wager associated with said round of play of the roulette game.

18. The method of claim 17, wherein the supplemental wager and any additional supplemental wagers are each associated with the first and second target characteristics.

19. The method of claim 15, which is provided through a data network.

20. The method of claim 19, wherein the data network is an internet.

* * * * *